US012443323B2

(12) United States Patent
Wong

(10) Patent No.: US 12,443,323 B2
(45) Date of Patent: Oct. 14, 2025

(54) ISSUE TRACKING SYSTEM HAVING A VIRTUAL MEETING SYSTEM FOR FACILITATING A VIRTUAL MEETING IN A THREE-DIMENSIONAL VIRTUAL ENVIRONMENT

(71) Applicants: Atlassian Pty Ltd., Sydney (AU); Atlassian US, Inc., San Francisco, CA (US)

(72) Inventor: Peter Wong, Sydney (AU)

(73) Assignees: ATLASSIAN PTY LTD., Sydney (AU); ATLASSIAN US, INC., San Francisco, CA (US)

(*) Notice: Subject to any disclaimer, the term of this patent is extended or adjusted under 35 U.S.C. 154(b) by 0 days.

(21) Appl. No.: 18/092,129

(22) Filed: Dec. 30, 2022

(65) Prior Publication Data

US 2024/0220066 A1   Jul. 4, 2024

(51) Int. Cl.
*G06F 3/04815* (2022.01)
*G06F 3/04842* (2022.01)
*G06F 3/04845* (2022.01)
*G06Q 10/06* (2023.01)
*G06Q 10/063* (2023.01)
*G06Q 10/0631* (2023.01)
*G06Q 10/0633* (2023.01)
*G06Q 10/0639* (2023.01)
*G06Q 10/10* (2023.01)
*G06Q 10/101* (2023.01)
*G06Q 10/1093* (2023.01)

(52) U.S. Cl.
CPC ...... *G06F 3/04815* (2013.01); *G06F 3/04842* (2013.01); *G06F 3/04845* (2013.01); *G06Q 10/06313* (2013.01); *G06Q 10/0633* (2013.01); *G06Q 10/101* (2013.01); *G06Q 10/103* (2013.01); *G06Q 10/1097* (2013.01); *G06F 2203/04803* (2013.01); *G06Q 10/06* (2013.01); *G06Q 10/063* (2013.01); *G06Q 10/06398* (2013.01); *G06Q 10/10* (2013.01)

(58) Field of Classification Search
None
See application file for complete search history.

(56) References Cited

U.S. PATENT DOCUMENTS 9,009,618 B2 * 4/2015 Schone ................ G06F 16/00
715/772
10,013,408 B2 * 7/2018 Nakamori ............ G06F 40/169
10,303,187 B1 * 5/2019 McNamara ............ G06F 7/00
(Continued)

*Primary Examiner* — Maria S Ayad
(74) *Attorney, Agent, or Firm* — Brownstein Hyatt Farber Schreck, LLP

(57) ABSTRACT

A method of facilitating a virtual meeting using virtual interactions with three-dimensional virtual objects to change statuses of issues being tracked by an issue tracking system may include, causing a three-dimensional virtual environment to be displayed to a first user and a second user, the three-dimensional virtual environment including a representation of the first user, a representation of the second user, a representation of a three-dimensional workspace, a first virtual object displayed in the three-dimensional workspace and representing a first issue in an issue tracking system, and a second virtual object displayed in the three-dimensional workspace and representing a second issue in the issue tracking system.

18 Claims, 21 Drawing Sheets

(56) References Cited

U.S. PATENT DOCUMENTS

| | | | |
|---|---|---|---|
| 10,719,332 B1* | 7/2020 | Dwivedi | G06F 8/65 |
| 10,762,471 B1* | 9/2020 | Wang | G06F 16/275 |
| 10,990,240 B1* | 4/2021 | Ravasz | G06F 3/011 |
| 11,249,627 B2* | 2/2022 | Mondri | G06Q 10/101 |
| 11,418,551 B2* | 8/2022 | Shin | H04L 65/4015 |
| 2002/0184055 A1* | 12/2002 | Naghavi | G16H 40/63 |
| | | | 705/2 |
| 2003/0081010 A1* | 5/2003 | An Chang | G06F 16/904 |
| | | | 715/835 |
| 2007/0097113 A1* | 5/2007 | Lee | G06F 3/04815 |
| | | | 345/419 |
| 2009/0249228 A1* | 10/2009 | Cheng | G06F 3/0481 |
| | | | 715/758 |
| 2009/0259937 A1* | 10/2009 | Rohall | G06Q 10/10 |
| | | | 709/204 |
| 2010/0125814 A1* | 5/2010 | Lemons | G06Q 10/06316 |
| | | | 705/7.26 |
| 2011/0310120 A1* | 12/2011 | Narayanan | G06F 3/04842 |
| | | | 345/633 |
| 2012/0053754 A1* | 3/2012 | Pease | B60W 50/0098 |
| | | | 701/1 |
| 2014/0143232 A1* | 5/2014 | Abe | G16H 10/60 |
| | | | 707/722 |
| 2016/0241609 A1* | 8/2016 | Xin | G06F 3/0484 |
| 2016/0350973 A1* | 12/2016 | Shapira | G06F 3/011 |
| 2018/0359448 A1* | 12/2018 | Harries | G06Q 10/101 |
| 2020/0037019 A1* | 1/2020 | Liusaari | G06F 3/0482 |
| 2020/0272324 A1* | 8/2020 | Chanda | G06F 3/04883 |
| 2021/0096726 A1* | 4/2021 | Faulkner | G06F 1/1626 |
| 2022/0083197 A1* | 3/2022 | Rockel | G06F 3/011 |
| 2022/0222426 A1* | 7/2022 | Zionpour | H04L 63/105 |
| 2022/0262504 A1* | 8/2022 | Bratty | G16H 20/30 |
| 2022/0327646 A1* | 10/2022 | Suzuki | A63F 13/213 |
| 2023/0207063 A1* | 6/2023 | Ward | G16B 30/00 |
| | | | 702/20 |
| 2023/0239168 A1* | 7/2023 | Prasad | H04N 7/152 |
| | | | 709/204 |
| 2024/0061547 A1* | 2/2024 | Fleizach | G06F 3/04815 |
| 2024/0152902 A1* | 5/2024 | Rapowitz | G06Q 20/367 |

* cited by examiner

ISSUE TRACKING SYSTEM HAVING A VIRTUAL MEETING SYSTEM FOR FACILITATING A VIRTUAL MEETING IN A THREE-DIMENSIONAL VIRTUAL ENVIRONMENT

TECHNICAL FIELD

Embodiments described herein relate to an issue tracking system and, in particular, to systems and methods for managing issues of an issue tracking system using a three-dimensional virtual environment.

BACKGROUND

Managing large projects or engineering teams requires tracking multiple tasks to be performed by the various team members. Traditionally, status updates are obtained individually or in a periodic status meeting in which a meeting organizer or secretary takes notes to record the various updates and team progress. In some cases, meeting participants may input status updates directly to an issue tracking system.

SUMMARY

A method of facilitating a virtual meeting using virtual interactions with three-dimensional virtual objects to change statuses of issues being tracked by an issue tracking system may include causing a three-dimensional virtual environment to be displayed to a first user and a second user, the three-dimensional virtual environment including a representation of the first user, a representation of the second user, a representation of a three-dimensional workspace, a first virtual object displayed in the three-dimensional workspace and representing a first issue in an issue tracking system, and a second virtual object displayed in the three-dimensional workspace and representing a second issue in the issue tracking system. The method may include receiving, from the first user, a three-dimensional interaction with the first virtual object and a selection of the second user, and in response to receiving the three-dimensional interaction with the first virtual object and the selection of the second user assigning the first issue to the second user, changing a visible property of the first virtual object to indicate the assignment of the first issue to the second user.

A method of facilitating a virtual meeting using virtual interactions with three-dimensional virtual objects to change statuses of issues being tracked by an issue tracking system may include causing a three-dimensional virtual environment to be displayed to a first user and a second user, the three-dimensional virtual environment including a representation of the first user, a representation of the second user, a representation of a three-dimensional workspace, a set of virtual objects, each respective virtual object of the set of virtual objects associated with a respective issue in an issue tracking system and assigned to a respective user of the issue tracking system. The three-dimensional virtual environment may be viewable in a first viewing scheme in which virtual objects associated with issues that are assigned to the first user are displayed in accordance with a first visual style and virtual objects associated with issues that are assigned to users other than the first user are displayed in accordance with a second visual style different from the first visual style, and a second viewing scheme in which each virtual object of the set of virtual objects is displayed in accordance with the first visual style.

A method of facilitating a virtual meeting using virtual interactions of three-dimensional virtual objects to change statuses of issues being tracked by an issue tracking system may include causing display of a three-dimensional virtual environment to a first user and a second user, the three-dimensional virtual environment including a representation of the first user, a representation of the second user, a representation of a three-dimensional workspace, and a virtual object displayed in the three-dimensional workspace and representing an issue in an issue tracking system. The issue may be associated with a set of attributes. The method may further include detecting a first virtual interaction between the first user and the virtual object in the three-dimensional virtual environment, the first interaction configured to change a first attribute of the set of attributes of the issue, in response to detecting the first virtual interaction, changing a first visual property of the virtual object in the three-dimensional virtual environment, detecting a second virtual interaction between the first user and the virtual object in the three-dimensional virtual environment, the second interaction configured to change a second attribute of the set of attributes of the issue, the second attribute different from the first attribute, and in response to detecting the second virtual interaction, changing a second visual property of the virtual object in the three-dimensional virtual environment, the second visual property different from the first visual property.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
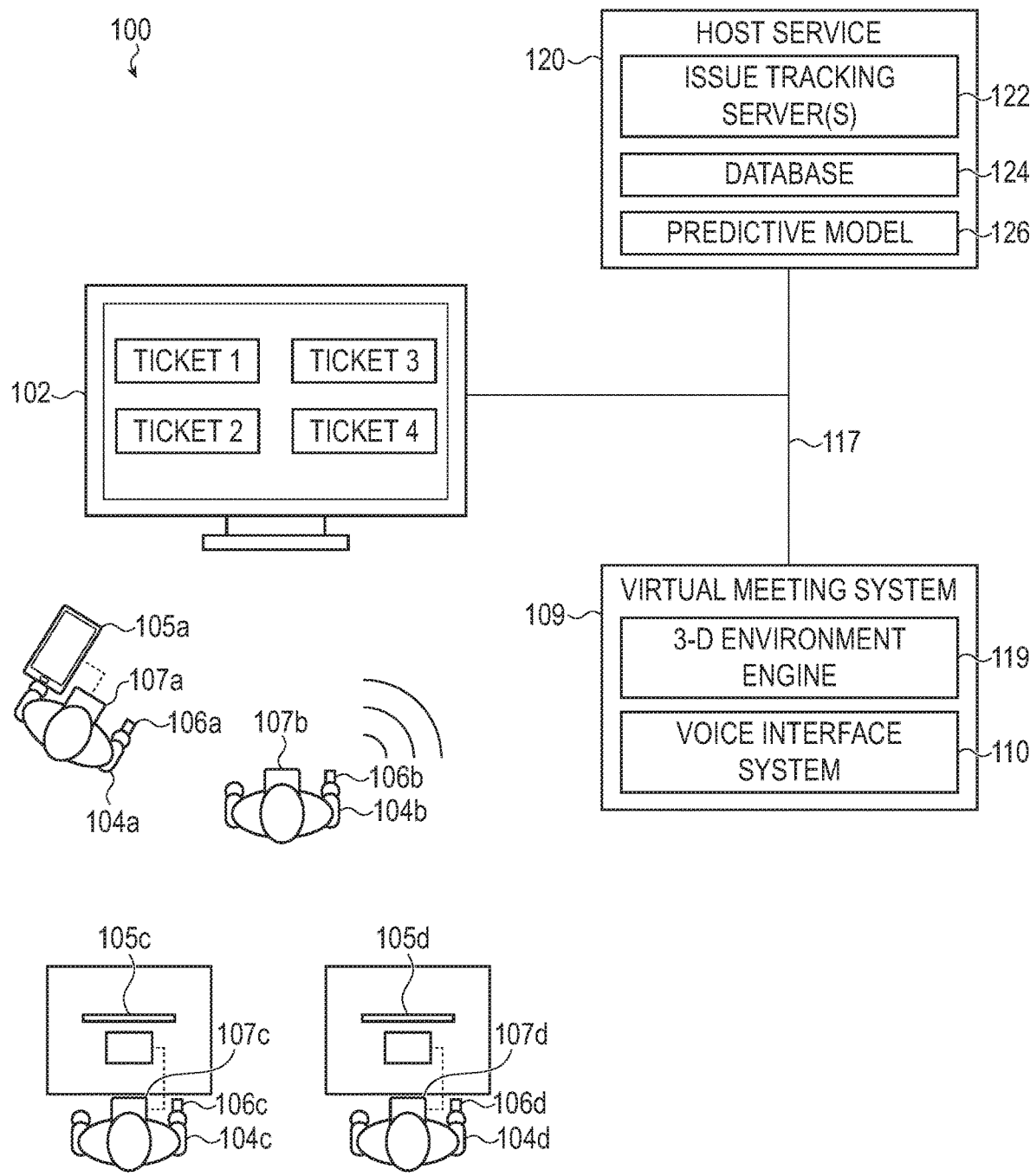
FIG. 1 depicts a schematic representation of an issue tracking system having a virtual meeting system.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Issue tracking systems facilitate the tracking and management of issues in various contexts. For example, issue tracking systems may be used to track issues (which may generally correspond to tasks that are to be performed by an individual) that are associated with a software development project, an information technology helpdesk, or other projects. One feature of an issue tracking system as described herein is the ability to establish a project timeline or status chart that shows the status of various issues and tracks changes to the issues as they are advanced through the various states of completion.

A graphical user interface for an issue tracking system may provide issue status charts, such as a Kanban Board, which users may use to track issues and their status. For example, during a progress meeting, sometimes referred to as a stand-up meeting or scrum, team members may take turns interacting with the issue status chart (e.g., via networked client devices) to advance their issues through the various available states (e.g., not started, in progress, complete).

Increasingly, meetings are being performed in three-dimensional virtual environments (e.g., virtual reality environments, augmented reality environments). For example, virtual avatars of each participant may be displayed in the three-dimensional virtual environment to simulate an in-person meeting. While virtual meetings may essentially mimic in-person meetings, this does not necessarily take full advantage of the functionality of the three-dimensional virtual environment. For example, for a status or "stand-up" meeting, simply replicating a conventional two dimensional status chart for each user to view during a three-dimensional virtual meeting does not leverage the additional ways in which information can be displayed in the virtual environment or the additional ways that participants can interact with three-dimensional virtual objects.

Accordingly, described herein is a three-dimensional meeting system that is configured to facilitate a meeting in which issue statuses may be tracked using a three-dimensional paradigm in which issues (and associated information) are represented by three-dimensional objects, and users interact with and/or manipulate the three-dimensional objects to advance their issues through various states of completion. For example, issues may be represented by three-dimensional objects, and may be displayed in a three-dimensional workspace. The properties of the three-dimensional objects may be mapped to the attributes of the issues to allow fast and efficient recognition of the relevant information. For example, different types of issues may be assigned different three-dimensional shapes. As another example, the size of a three-dimensional shape may correspond to an estimated size or complexity of an issue. As yet another example, the color of a three-dimensional object may correspond to the user to whom the issue is assigned. Thus, by viewing the three-dimensional object (and the multiple objects that may be displayed in the workspace to represent a given project), the participants can quickly and easily perceive multiple relevant items of information about a given issue.

Further, the placement of virtual objects in the three-dimensional workspace may correlate to attributes of the issues with which they are associated. For example, the completion status of an issue may be represented by a distance from the avatar of the user to whom the issue is assigned. As another example, the assignee of an issue may be indicated by displaying an associated object in a particular location relative to the avatar of the assignee.

The three-dimensional virtual environment and the ability for users to manipulate objects in the three-dimensional virtual environment also facilitates various unique ways of interacting with issues. For example, participants can change issue statuses by moving three-dimensional objects in the three-dimensional workspace. As another example, participants can assign issues by picking them up and handing them to another participant.

In some cases, the three-dimensional workspace and the virtual objects may be further analogized to other three-dimensional paradigms that can improve engagement with and/or visualization of an overall project. For example, instead of using generic shapes to represent the issues, a status chart for a project may be represented as a virtual football or rugby game, in which participants advance balls along a virtual field to represent the status of the issues. As another example, a status chart may be represented as a dinner table and issues may be represented as food items. Issue progress or status may be represented by a participant finishing the food on his or her plate. Other virtual paradigms are also possible.

An issue tracking system, as described herein, may be used to refer to a project management tool that may be specially configured for tracking issues and tasks that are associated with a software development project. As described herein, an issue tracking system may be used to refer to a project management tool that can be implemented in whole or in part as software executed by a virtual or physical server or other computing appliance that provides a team of individuals with a means for documenting, tracking, and monitoring completion of work as discrete tasks related to completion, development, or maintenance of a defined project or goal. In many examples, an issue tracking system is configured for use by a software development team to track completion and assignment of discrete tasks related to software development projects from creation of new user stories or epics (i.e., user-perspective feature requests or desired functionality), through proof of concept testing, through integration testing, through release of software to one or more users, and through reporting and fixing of software errors ("bugs"). In other cases, an issue tracking system can be configured for non-software tracking purposes, such as for use by a human resources team, an information technology support group, and so on.

An issue tracking system, as described herein, may increase the efficiency of a team of individuals working on a common goal or project by facilitating the organization of the assignment of discrete items of work to the individual or team of individuals most suited to perform that work. More particularly, each item of work tracked by an issue tracking system is referred to as an "issue" that is typically assigned to a single individual to complete. Example "issues" can relate to, without limitation: a task to identify the cause of a software bug; a task to perform a feasibility assessment for implementation of a new feature; a task to fix an identified software bug; and so on.

For purposes of the following disclosure, the terms "issue report," "issue," and "ticket" may be used to generally refer to an issue or item that is being tracked by the system. More specifically, the term "issue request" is generally used to describe input provided by a user to an issue tracking system that may result in a creation of an "issue record." As used herein, the term "issue record" may be used to refer to a discrete database record associated with an issue or item being tracked by an issue tracking system. As used herein, an issue record may correspond to a discrete task or set of tasks to be accomplished by the one or more assignees. The issue record may include a description of the tasks to be completed, a status, a time estimate, complexity, and other descriptive attributes. An issue record may also correspond to a story or an epic, which may relate to a long-term goal or set of product features to be developed. Although not required, an issue record can be stored, at least temporarily, in a database accessible to an issue tracking system. While these terms are used herein with respect to specific examples and potential implementations, it may be appreciated that these are merely examples and other embodiments can be configured to receive, anticipate, predict and/or recommend additional or alternative data, user inputs, or issue requests or issue records associated with an issue tracking system.

These foregoing and other embodiments are discussed below with reference to FIGS. 1-13. However, those skilled in the art will readily appreciate that the detailed description given herein with respect to these figures is for explanatory purposes only and should not be construed as limiting.

FIG. 1 depicts a schematic diagram of an example implementation of an issue tracking system 100 also referred to herein as simply system 100. In particular, FIG. 1 depicts an issue tracking system 100 including a virtual meeting system 109 that is operably coupled to a host service 120 by a network 117.

As shown in FIG. 1, the virtual meeting system 109 may be operably coupled to a host service 120 via a network 117. The host service 120 may include one or more issue tracking servers 122, one or more databases 124, and one or more models 126. The issue tracking server 122 is generally configured to store, track, and modify groups of issue records that are associated with various projects or tasks that are performed by different teams. A distinct set of issue records may be associated with a particular project or team, which is the subject of the virtual meeting. The virtual meeting system 109 may be adapted to receive a selection from one or more of the participants 104 of the live meeting and identify a set of issue records to be represented in the virtual environment. While the participants 104a-d are depicted as being located in a shared geographic location (e.g., in a common meeting room or meeting space), it is not necessary that all of the participants 104a-d be physically collocated. Indeed, one advantage of the virtual meeting paradigm is that the participants can experience the meeting as an in-person while being physically remote.

In one example described herein, the set of issue records is associated with issues or tasks of a particular project during a weekly or daily stand-up meeting. In other examples, another set of items is obtained from the host service, which may correspond to a set of discussion points, topics, or other items to be discussed during the live meeting. In the present example, the issue records and other persistent stored computer items that may be modified during the course of the virtual meeting are stored on the host service 120. The host service 120 may also be operably coupled to a terminal device 102 by the network 117. The terminal device 102 includes a display that is configured to display a graphical user interface. The graphical user interface may mirror the discussion during the live meeting and, in the present example, may display a set of graphical objects that corresponds to a subset of the issue records or items that is associated with a topic of discussion during the live meeting. The terminal device 102 may be used by a participant who is not participating in the meeting via the three-dimensional virtual environment. In some cases, the terminal device 102 may be omitted or not used during a virtual meeting as described herein.

The virtual meeting system 109 may facilitate a virtual meeting attended by the meeting participants 104a-d and conducted in accordance with a predefined or semi-structured format, or in a free-form format. The virtual meeting system 109 may include a three-dimensional environment engine 119 that generates a three-dimensional virtual environment, causes the three-dimensional virtual environment to be displayed to participants 104, receives inputs from the participants 104 (e.g., manipulations of three-dimensional objects in the three-dimensional virtual environment), and updates the three-dimensional virtual environment in response to the inputs.

The three-dimensional environment engine 119 may include rendering engines and other programs or processes to generate the three-dimensional virtual environment, and/or to support the generation and rendering of the three-dimensional virtual environment on head-mounted displays worn by the participants 104. In some cases, operations related to generating and rendering the three-dimensional virtual environment to participants (e.g., on head-mounted displays) are shared among the three-dimensional environment engine 119, head-mounted displays (HMDs) 107, and/or client devices 105 that are associated with and/or connected to the HMDs 107.

The three-dimensional virtual environment generated by the three-dimensional environment engine 119 (and/or the client devices 105 and HMDs 107) may include a representation of each participant 104 (e.g., an avatar), a representation of a three-dimensional workspace, and virtual objects that represent issues from the host service 120 that are relevant to the project or team that is the subject of the virtual meeting. The representations of the participants may uniquely visually represent the participants. For example, an avatar's appearance may resemble its participant, though this is not necessary. In some cases, participants may customize their avatar.

The representation of the three-dimensional workspace may include a predefined three-dimensional virtual region or object in which virtual objects representing issues may be displayed. The three-dimensional workspace may resemble a surface (e.g., a solid surface, a table top, a game field) or a volume (e.g., a three-dimensional region in space, optionally defined by visible boundaries). Properties of the three-dimensional workspace may be associated with attributes of issues. For example, a distance between an avatar and a virtual object representing an issue may correspond to a percentage of completion of the issue (e.g., the further an object is from an avatar, the closer the issue is to being completed). As another example, a position of a virtual object in the three-dimensional workspace may correspond to its status (e.g., the three-dimensional workspace may have different regions for "not started," "in progress," and "completed," and the placement of a virtual object in a given region indicates its status).

The three-dimensional virtual environment may also include virtual objects, displayed in the three-dimensional workspace, that represent issues in the host service 120. In some cases, the three-dimensional environment engine 119 communicates with the host service 120 to retrieve issue records that are to be represented in the three-dimensional virtual environment. The three-dimensional environment engine 119 then generates (and causes display of) virtual objects that represent the issues. Generating the virtual objects includes mapping attributes of the issues to properties of the virtual objects, and generating the virtual objects in accordance with the mapped attributes. For example, the virtual objects may have various properties that define their appearance, including but not limited to shape, size, color, apparent texture, fill style (e.g., solid vs. wireframe), and location within the virtual workspace (e.g., relative to a predefined region in the workspace, relative to an avatar, etc.). Additionally, the virtual objects may be displayed in conjunction with other virtual elements, such as text (e.g., shown on the virtual object or in proximity to the virtual object), directional elements or animations (e.g., arrows pointing from virtual objects to avatars to indicate an assignment relationship), and the like.

As one nonlimiting example of the three-dimensional environment engine 119 generating a virtual object, the three-dimensional environment engine 119 may determine the shape of the virtual object based on the issue type, a color of the virtual object based on an assignee (e.g., a color that matches a color associated with the avatar of the assignee), and a location of the virtual object in a status chart based on its completion status. In another example, the three-dimensional environment engine 119 may determine the color of the virtual object based on the issue type, a first location of the virtual object in a workspace based on an assignee (e.g., in a region uniquely associated with the avatar of the assignee), and a second location of the virtual object based on its completion status (e.g., a distance away from the avatar of the assignee). Other mappings between visual and/or display properties of the virtual objects and the attributes of the issues are also contemplated.

As described herein, the three-dimensional virtual environment may represent the present state of the issues (as defined in their issue records for example), and may be used to update or change the issues (e.g., by updating the issue records associated with the issues). To update or change issues, the three-dimensional environment engine 119 may detect virtual interactions between the participants 104 and the three-dimensional virtual environment, and update the three-dimensional virtual environment and the issues in accordance with the substance of the virtual interactions. The participants 104 may use controllers 106 to interact with the three-dimensional virtual environment. The controllers may include motion sensing systems, buttons, directional controllers (e.g., directional pads, joysticks), or other systems to detect inputs from a participant and communicate those inputs to the three-dimensional environment engine 119 (e.g., via the network 117). In some cases, the controllers 106 are or include motion-sensing gloves that detect hand and/or finger motions and gestures. In some cases, instead of or in addition to controllers 106, motion-capture systems may detect physical movements and gestures of a participant, and convert the physical movements to inputs to the three-dimensional environment engine 119.

Figure 3:
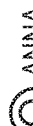
FIG. 3 depicts an example graphical user interface of an issue in an issue tracking system.

In response to detecting or receiving a three-dimensional manipulation of a virtual object, the three-dimensional environment engine 119 may update both the three-dimensional environment and the issue associated with the virtual object. As described herein, there are various three-dimensional manipulations of virtual objects, and they may change the issue in various ways. For example, a user may manipulate a virtual object by picking up the virtual object and handing it to an avatar of another participant, which may serve to "assign" the underlying issue to that participant. In such cases, the three-dimensional environment engine 119 may change the underlying issue to reflect the assignee, and change a visible property of the virtual object to visually associate the virtual object with the avatar. As another example, a user may manipulate a virtual object by picking up the virtual object and moving it to another location in the three-dimensional virtual environment, which may serve to change a status of the underlying issue. In such cases, the three-dimensional environment engine 119 may change the underlying issue record to reflect the assignee. In this case, the new location of the virtual object may have been determined by the user's manipulation of the virtual object, and further animations of the virtual object may be omitted. Other manipulations may be used for assigning issues and changing the status of issues, and other issue attributes may be modified by the manipulations as well. Moreover, participants may also provide inputs during the virtual meeting using other input techniques as well, such as voice inputs (using a voice interface system 110 as described herein), keyboard inputs, manipulating a two-dimensional graphical user interface (as shown in FIG. 3) with a mouse, and the like.

The virtual meeting system 109 may communicate with other systems and/or services, such as the host service 120, via application programming interfaces (API), or another suitable communication protocol. The virtual meeting system 109 may generate API calls in response to the occurrence of certain interactions within the three-dimensional virtual environment, and more particularly, to interactions within the three-dimensional virtual environment that require acquisition of data or other information from other systems and/or services, and/or that are configured to change data or information on other systems and/or services. In general, the API calls are structured in accordance with a schema or protocol determined by the respective system and/or service and may include data used by the respective system and/or service to service the API call. Such data may include, for example, an identifier of an issue record, one or more user identifiers (e.g., an identifier of an individual to whom an issue is being assigned, an identifier of an individual who has changed an issue status, etc.), data or other information indicating an updated status for an issue, textual data for inclusion in an issue record (e.g., a description, a status update, etc.), data or other information indicating a project to which an issue relates, or the like. In some cases, the API call is a structured query or search operation. In some cases the API call may modify or change data objects managed by the respective system and/or service. For example, in some cases, any data and/or attributes associated with an issue record may be changed, modified, updated, or retrieved via an API call. API calls may also be used to create and/or delete issue records.

As one particular example of an API call between the virtual meeting system 109 and another system, such as the host service 120, participants in a virtual meeting in a three-dimensional virtual environment may interact with virtual objects that represent issues in an issue tracking system, and manipulations of the objects may trigger one or more changes to one or more attributes of an issue. When such a manipulation is detected, the virtual meeting system 109 may generate and execute an API call to the host service 120 that includes information to effectuate the change. For example, if the manipulation is configured to assign an issue to a user, the API call may include an identifier of the issue to be assigned, an identifier of the user to whom the issue is being assigned, an identifier of a user who has issued or initiated the assignment (e.g., the participant who manipulated the associated object in the virtual meeting), and an indicator of the action to be taken (e.g., that the issue should be assigned to the identified assignee). Of course, more, fewer, or different information may be included in any given API call. Upon receiving the API call, the host service 120 performs the actions requested by the API, such as by updating the identified issue record to reflect the identified assignee. Other API calls may be made to the host service 120, such as API calls to change a status of an issue (which may include an identifier of the issue record, an identifier of the user changing the status, and the new status of the issue), API calls to retrieve a status of an issue (which may include an identifier of the issue record and an identifier of the attribute to be returned, such as the issue status), API calls to retrieve a set of issues associated with a project (which may include an identifier of a project), and the like. In response to some API calls, the host service 120 may provide data to the requesting service (e.g., the virtual meeting system 109), such as when the virtual meeting system 109 is populating a workspace in a virtual meeting with issues. While example API calls from the virtual meeting system 109 to the host service 120 are described, API calls may be used by any of the components, devices, or services of the system 100 to facilitate communications and interoperability therebetween.

The virtual meeting system 109 may also include a voice interface system 110, as noted above. The voice interface system 110 may provide an additional or alternative input paradigm for the virtual meeting. For example, instead of or in addition to manipulating three-dimensional objects to change an attribute of an underlying issue (e.g., to change its status), users may provide voice inputs to make changes (e.g., "move issue 1 to in progress"). The voice interface system 110 may detect the voice inputs and make the requested change to the issue attribute. The voice interface system 110 may interact with the three-dimensional environment engine 119 to cause the three-dimensional environment to be updated accordingly, or the three-dimensional environment engine 119 may retrieve the updated issue records from the host service 120 and update the three-dimensional virtual environment accordingly. The voice interface system 110 may also be adapted to participate in the virtual meeting as a member or participant and, in some cases, the voice interface system 110 is adapted to lead or direct the virtual meeting and may identify relevant discussion points and/or extract key data from live discussion among the participants 104. Additional details of an example voice interface system 110 are described herein.

FIG. 1 represents one schematic representation of system 100 having a networked or cloud-based architecture. In the illustrated embodiment, the system 100 is implemented with a client-server architecture including a host service 120 that communicably couples (e.g., via a network 117 that includes one or more networking or wired or wireless communication protocols) to the virtual meeting system 109 and the terminal device 102. The host service 120 may also be operably coupled (via the network 117) to one or more client devices 105a-d that are associated with or operated by the meeting participants 104a-d. It may be appreciated that other client devices, terminal devices, workstations, or other devices may be configured in a substantially similar manner as the client devices 105a-d, although this may not be required of all embodiments and different client devices can be configured differently and/or may transact data or information with, and/or provide input(s) to, the host service 120 in a unique or device-specific manner.

The virtual meeting system 109 may be implemented on a computing platform that includes a processor or a processing unit, volatile or non-volatile memory (identified, collectively, as the memory), and a display. An example virtual meeting system 109 is described below with respect to FIG. 12. In some cases, the virtual meeting system 109 and the terminal device 102 are implemented on a shared computing platform and, in some cases, may operate using shared hardware components. In some implementations, the virtual meeting system 109 and/or the terminal device 102 are implemented on a laptop computer, desktop computer, virtual workstation terminal, or other computer hardware platform. As noted above, the terminal device 102 may be omitted or may be unused during the virtual meeting.

The client devices 105a-d can be any suitable personal or commercial electronic device and may include, without limitation or express requirement, a processor or processing unit, volatile or non-volatile memory (identified, collectively, as the memory), and a display. Example electronic devices include, but are not limited to: laptop computers; desktop computers; cellular or mobile phones; tablet computing devices; and so on. It may be appreciated that client devices 105a-d, such as described herein, can be implemented in any suitable manner. The client devices 105a-d may be communicatively coupled to and may provide processing operations for the head-mounted displays 107a-d and the controllers 106a-d. In some cases, participants may connect to the virtual meeting using only an HMD 107 (e.g., without a tethered or separate client device 105). It will be understood that participation in a virtual meeting may be facilitated by various different devices or combinations thereof, and the present concepts are not limited to any one specific device (or combination of devices) to participate in the meeting.

The HMDs 107 may be any suitable mounted device that can display a virtual environment to a user. As used herein, a virtual environment includes both completely virtual environments (e.g., where all aspects of the environment are virtual), or partially virtual environments (e.g., a mix of real and virtual objects). Partially virtual environments are sometimes referred to as "augmented reality" environments. The HMDs 107 may include any suitable display technology, including display screens or projectors, and any associated lenses, processors, memory, and communications systems to display the virtual environment to the user. The HMDs 107 may resemble "virtual reality headsets," "smart glasses," or the like.

As shown in FIG. 1, the host service includes a model 126, which may be used to identify and access one or more of the issue records stored in the database 124 associated with the issue tracking server 122. The model 126 may be accessed by the virtual meeting system 109 to identify one or more issues that are relevant to the current discussion or the virtual meeting.

In many embodiments, the host service 120 is configured to operate within or as a virtual computing environment that is supported by one or more physical servers including one or more hardware resources such as, but not limited to (or requiring) one or more of: a processor or processing unit; a memory; non-volatile storage; networking connections; and the like. As used herein, a processor of the host service 120 may refer to one or more physical processors or processing units implemented on one or more physical computing systems that, alone or together, can be configured to implement the functionality described herein. The host service 120 may be implemented on a single computing system or using a distributed network of computing systems. For simplicity of description and illustration, the various hardware configurations associated with a processor, computing device, or hardware architecture are not shown in FIG. 1. Hardware aspects of the host service 120 may correspond to the hardware of the voice interface system 110 described below with respect to FIG. 12. In general, the hardware of the host service 120 may be distributed across multiple servers or physical computing devices in order to allow for scalability and remote access from a variety of geographic locations.

In many embodiments, the host service 120 and the virtual meeting system 109 can include a number of discrete subservices or purpose-configured modules, containers, or virtual machines each configured to perform, coordinate, serve, or otherwise provide one or more services, functions, or operations of the host service 120 or the virtual meeting system 109. Example operations include the capture and analysis of three-dimensional manipulations and voice and other inputs during a virtual meeting; changing issue attributes in response to the manipulations and inputs (e.g., by changing issue records); and updating the three-dimensional virtual environment to reflect the updated issue attributes. In the example of FIG. 1, the host service 120 includes one or more issue tracking server(s) 122, which may be used to track the various tickets, issues, issue records, and other information associated with the system 100. As described above, the issue tracking server(s) 122 may be operably connected to (or may include) one or more database(s) 124 that are used to store the data and other information used by the issue tracking server(s) 122. As described herein, the system 100 also includes a virtual meeting system 109 having various elements that are configured to serve as the interface between the participants 104a-d of the virtual meeting and the issue tracking server(s) 122 of the host service 120.

Figure 2:
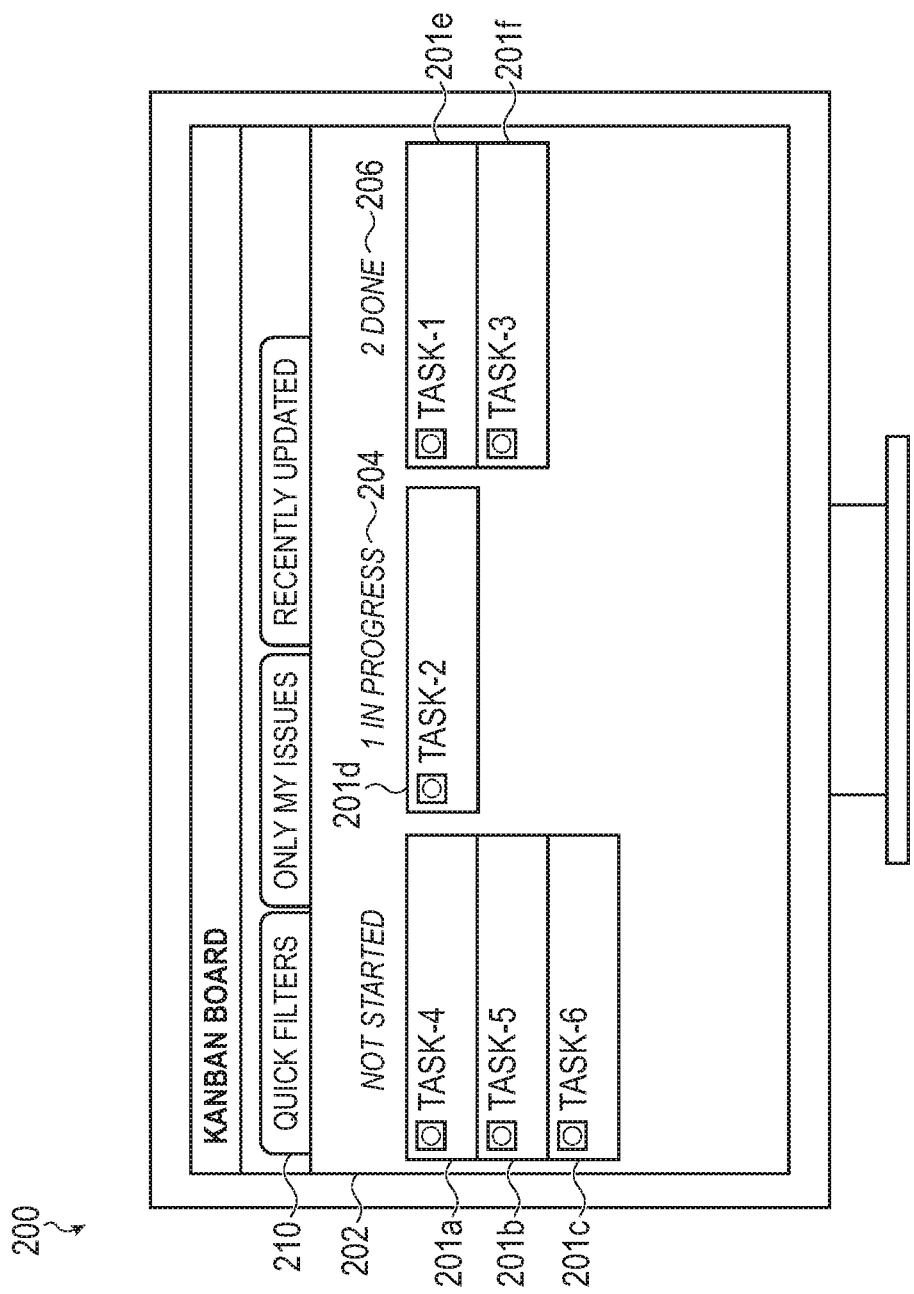
FIG. 2 depicts an example graphical user interface of an issue tracking system displayed on a terminal or client device.

FIG. 2 depicts an example graphical user interface 200 representing a two-dimensional view of a Kanban Board, which displays issues and their statuses. The graphical user interface 200 may be generated by an issue tracking client application, which may include graphical objects remotely generated and viewed through a web browser and/or may include graphical objects that are generated locally on the client device by a dedicated issue tracking client application.

Graphical user interfaces such as this may be used in a non-virtual environment to illustrate issues and issue statuses. The graphical user interface 200 may also be accessible in a virtual environment (e.g., for a participant who wishes to temporarily or permanently view the board in a textual format), and may also be viewed and interacted with by a participant who is not otherwise interacting with the virtual environment of a virtual meeting. For example, a user who does not have access to a head mounted display or otherwise opts not to use the virtual environment may engage with the same issues that are represented in the virtual environment via the graphical user interface 200.

As shown in FIG. 2, the graphical user interface 200 may include graphical elements that correspond to one or more issues (also referred to herein as tickets or issue records) that are being tracked by an issue tracking system. In this example, the graphical elements or objects are labeled as issues 201a, 201b, 201c, 201d, 201e, 201f. With regard to this example, the terms "tasks," "issues," and "tickets" may be used to refer to the same issue or item that is being tracked by the issue tracking system. That is, each of the various issues 201 may correspond to one or more issues that are tracked by the issue tracking system.

As shown in FIG. 2, the various issues 201 may be grouped by status. A first group of issues 201a, 201b, 201c, are identified as having a first status 202 ("Not Started"). A second set of issues 201d are identified as having a second status 204 ("In Progress"). A third set of issues 201e, 201f are identified as having a third status 206 ("Done"). The issues may also be organized or filtered in accordance with one or more tabs 210 that allow easy navigation between different groups of issues. The depicted grouping is provided by way of example and is not intended to be limiting in nature.

In an interaction with the two-dimensional graphical user interface 200, participants may manipulate or modify the various issues through the graphical user interface via mouse or keyboard inputs. For example, a participant may drag and drop (or otherwise move) the various graphical objects associated with respective issues between the groups to indicate a change in status of the respective item. Changing the status of one or more items may result in an issue modification request being transmitted to a host service, which may edit or otherwise modify an existing issue record.

The graphical user interface 200 may be modified by the user to expand items or drill down to expose additional content for viewing and editing. For example, the various issues may be manipulated by manually selecting a respective issue, which may open or enlarge the respective issue in a window and present the user with a series of user-editable fields and/or user-selectable options. User interaction with a particular field or selectable option in the displayed issue may also result in an issue modification request being transmitted to a host service, which may edit or otherwise modify an existing issue record. Example modifications include without limitation, changing issue status, changing or adding an issue assignee, adding a comment or note, adding a linked issue or issue, and so on. The various modifications that are performed using the graphical user interface may result in the edit or modification of an existing issue record, the creation of a new issue record, and/or the deletion or closure of an existing issue record.

As described herein, a virtual meeting system may implement some or all of the same actions to a respective issue tracking server or host service rather than by direct control of the graphical user interface 200 (through use of an API or other interface). The various changes, modifications, or actions performed by or implemented using the virtual meeting system may be reflected in a modified graphical output in a way that may mimic a manual manipulation through the graphical user interface. For example, modifications may be animated, or graphical transitions may be provided to simulate actions being taken, even though the actions may have already occurred through the host service or issue tracking server. In this way, the virtual meeting system may be used to drive the meeting and visually present the results of the various updates as the meeting progresses.

In one example, a status of an issue is changed, through manipulation of a virtual object in the virtual environment, from "in progress" to "done." In accordance with the change in status, the respective issue may move from the "in progress" column 204 to the "done" column 206. Similarly, the graphical user interface may be adapted or modified to reflect added or deleted or closed issues or issues that result from action taken in the virtual environment.

FIG. 3 depicts an example graphical user interface 300 representing an example issue. The graphical user interface 300 may be displayed to a user on a client device or in a three-dimensional virtual environment, and which generally depicts example attributes (optionally referred to as issue object data) that may be associated with an issue. The graphical user interface 300 illustrates various attributes associated with the particular issue. Changes to the issue attributes occurring due to input received during a virtual meeting (and/or due to input received at the graphical user interface 300) will automatically be updated based on the inputs.

As shown in FIG. 3, the issue attributes may include text stored as fields or elements of the issue object. Issue fields include, for example, issue title, issue description, notes, and comments. Other issue data may include attachments or non-text content that is associated or stored with the issue object. Example non-text content includes screenshots, diagrams, and other graphical content that may be stored as image or other media files. Other example attachment content includes source code files, test results, user logs, and other similar content. The issue data may also include references or links to other system objects including, for example, projects, epics, other issues, stories, bugs, subtasks, or the like, which may have a parent-child relationship with the particular issue. Similarly, the issue attributes may include references or links to other issues, subtasks, or the like, and may have child-parent or other dependency and/or hierarchical relationship with the particular issue. The issue attributes may also include references or pointers to other system elements like a system user or user profile identified as an assignee, owner, reviewer, or other role associated with the issue object.

Figure 4A:
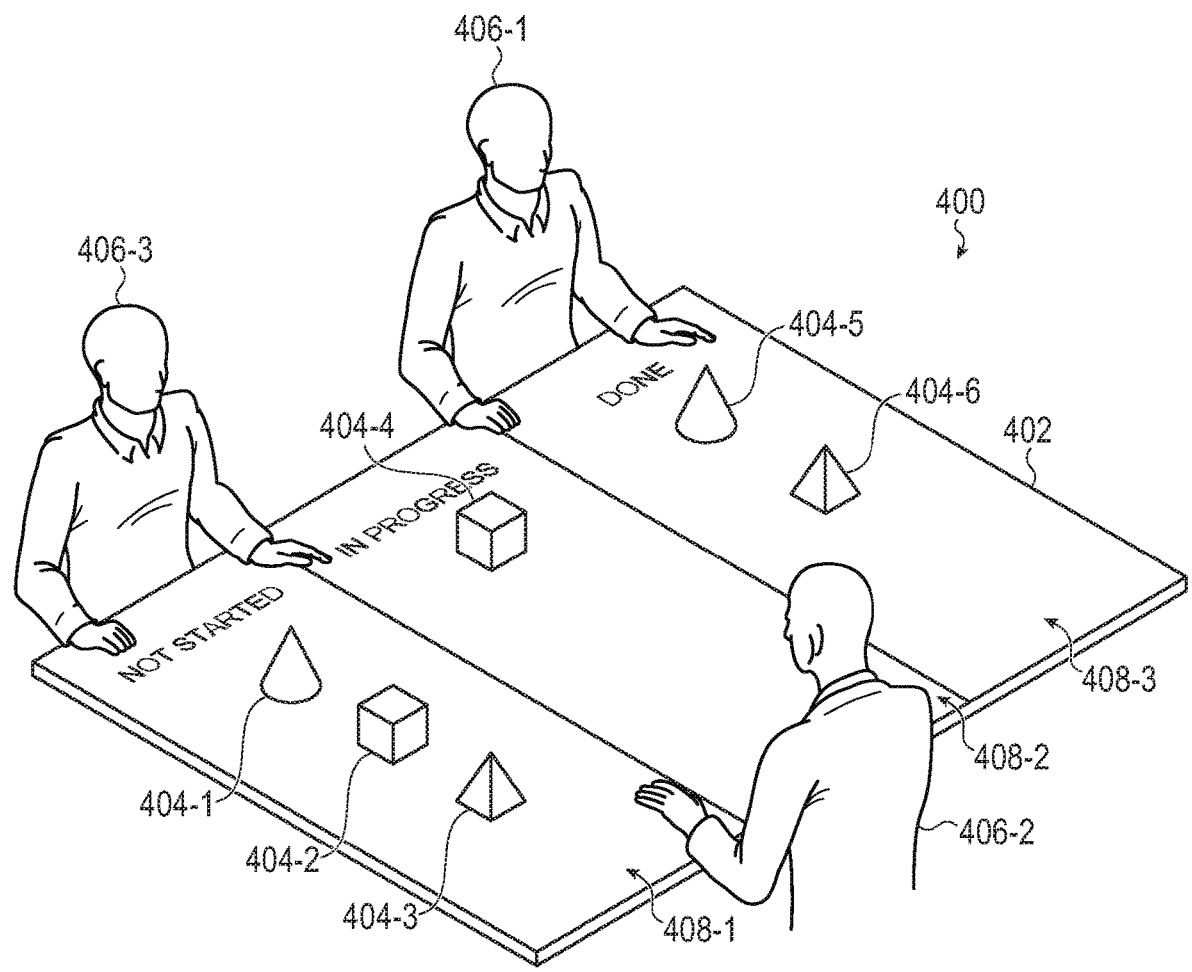
FIG. 4A depicts an example three-dimensional virtual environment for a virtual meeting.

FIG. 4A depicts an example three-dimensional virtual environment 400 in which a virtual meeting may be conducted. The three-dimensional virtual environment 400 may be generated by the virtual meeting system 109, in conjunction with the host services 120, and optionally the client devices 105, and HMDs 107. The three-dimensional virtual environment 400 may include representations 406-1, 406-2, and 406-3 (also referred to as avatars) of participants in the virtual meeting. The three-dimensional virtual environment 400 is shown with three participants, though any number of participants may be present in a given meeting.

The three-dimensional virtual environment 400 also includes a representation of a three-dimensional workspace 402 (also referred to simply as a workspace 402). The workspace 402 may resemble a table or other surface, as shown in FIG. 4A, though this is merely one example. In other examples, the workspace may be a three-dimensional volume (e.g., a cube), a differently shaped or configured surface, or the like. The workspace 402 may define different regions associated with different issue statuses. For example, the workspace 402 defines a first region 408-1 that is associated with a first issue status ("Not Started"), a second region 408-2 that is associated with a second issue status ("In Progress"), and a third region 408-3 that is associated with a third issue status ("Done").

The three-dimensional virtual environment 400 may also include virtual objects 404 that represent issues in an issue tracking system (e.g., of the host service 120, FIG. 1). As shown in FIG. 4A, the virtual objects 404 are represented as various three-dimensional prisms (e.g., cubes, cones, pyramids). In some cases, each shape may be associated with a particular issue type. For example, the issue tracking system may support various issue types (which may be stored as an attribute of a given issue record). Example issue types include, without limitation, epics, stories, tasks, bugs, subtasks, and service requests. Thus, for example, issues of the type "epic" may be associated with a cone shape, and issues associated with the type "issue" may be associated with a cube shape. Other mappings between issue types and shapes are also contemplated. Moreover, in some cases, the shape of a virtual object corresponds to a different attribute of an issue. For example, the shape may indicate an assignee of an issue, or an amount of work associated with an issue, or an importance of an issue. Indeed, as noted herein, any physical and/or visible property of a virtual object may be mapped to any attribute of the issue, and the particular mapping used in a given implementation may depend on various factors, such as user preference, the context of the virtual environment, and the like.

As shown in FIG. 4A, the virtual objects 404 are represented as various three-dimensional prisms (e.g., cubes, cones, pyramids), though these are merely examples, and other types of virtual objects may be displayed. For example, the virtual objects 404 may be displayed as cards (e.g., resembling playing cards), balls (e.g., sports balls), animals, food items, money, or any other suitable three-dimensional object. In some cases, the particular type of object that is used to represent issues may depend on or otherwise correspond to the context of the three-dimensional workspace 402. For example, as described with respect to FIGS. 11A-11C, a three-dimensional workspace may resemble a sports field, and the virtual objects may resemble sports balls.

The virtual objects 404 include virtual objects 404-1, 404-2, 404-3, 404-4, 404-5, and 404-6, which may correspond to issues in the issue tracking system, such as issues associated with the issues 201a, 201b, 201c, 201d, 201e, and 201f, respectively. The virtual objects 404 are displayed in the three-dimensional workspace 402 in a region that corresponds to the status of the underlying issue. Thus, for example, virtual objects 404-1, 404-2, and 404-3 are positioned in the region 408-1 associated with the first status ("Not Started"); virtual object 404-4 is positioned in the region 408-2 associated with the second status ("In Progress"); and virtual objects 404-5, 404-6 are positioned in the region 408-3 associated with the third status ("Done"). As described herein, virtual objects may be moved to different regions in the three-dimensional workspace 402 to change the status of the underlying issue. Thus, a user may manipulate the virtual object 404-1 to move it from the "Not Started" region to the "In Progress" region, thereby causing the underling issue to be transitioned to the "In Progress" status.

Figure 4B:
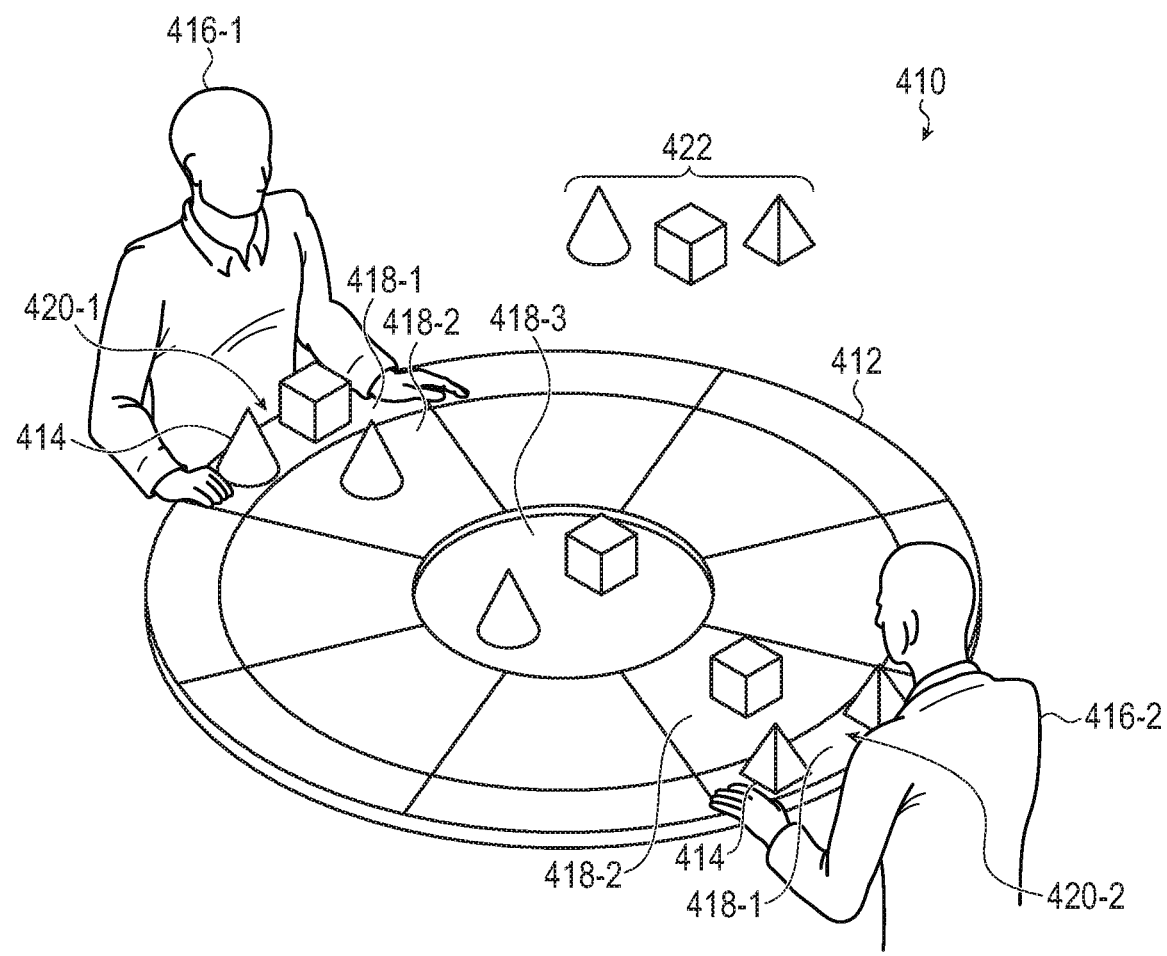
FIG. 4B depicts another example three-dimensional virtual environment for a virtual meeting.

FIG. 4B depicts another example three-dimensional virtual environment 410 in which a virtual meeting may be conducted. The three-dimensional virtual environment 410 may operate in the same or similar manner as the three-dimensional virtual environment 400, but may employ a different three-dimensional workspace and a different association between issue state (or progress) and location in the three-dimensional virtual environment. For example, instead of a workspace with columns indicating issue status, the three-dimensional virtual environment 410 may include a three-dimensional workspace 412 in which the status of an issue is represented by a distance away from an avatar to which the issue is assigned. This paradigm also provides a different way of visualizing the issues that are assigned to each participant.

More particularly, the three-dimensional virtual environment 410 includes avatars 416-1 and 416-2 representing participants in the virtual meeting. The three-dimensional workspace 412 is segmented (visibly and/or logically) into segments 420 (e.g., segment 420-1 and segment 420-2). Each segment may be assigned to a participant, and the assigned participant's avatar may be positioned proximate the assigned segment. Each participant's segment 420 may contain each of the virtual objects 414 (or issues) "assigned" to that participant. Thus, in this example, a location parameter of the virtual objects in the three-dimensional virtual environment 410 (e.g., the segment in which they are displayed) corresponds to the assignee of the underlying issue. This also provides a fast and efficient way for each participant to see what is assigned to them and what is assigned to other participants.

Additionally, the status or progress of an issue may be represented by the position of the virtual object within a given segment 420. Thus, participants may move their virtual objects 414 within their segment to change the status or progress of their issues. In one example, the segments 420 may be subdivided into regions 418 that correspond to predefined issue statuses. For example, a first region 418-1 (e.g., closest to the avatar) may be associated with a first issue status ("Not Started"), a second region 418-2 may be associated with a second issue status ("In Progress"), and a third region 418-3 (e.g., a hole or void in the workspace 412, or a basket or bucket for holding virtual objects) may be associated with a third issue status ("Done"). Users may advance their issues through these statuses by moving their virtual objects 414 within their segments 420.

In another example, the segments 420 may depict more granular information about the progress of a given issue. For example, in some cases, the completion percentage of an issue may be represented by the distance of the virtual object away from the avatar. Thus, for example, for an issue that is 0% complete, the corresponding virtual object may be at a closest position relative to the avatar, and for an issue that is 100% complete, the virtual object may be at a farthest position from the avatar (e.g., in the center of the workspace 412 or past an end of the workspace 412). The position of the virtual object between the closest and farthest available positions may be scaled according to the completion percentage of the issue. In some cases, the association between position and completion is reversed, and virtual objects are moved towards the avatar to indicate increasing completion percent (in which case, moving the virtual objects off of the end of the workspace 412 may indicate completion of the issue).

As noted above, assignment of an issue to a participant in the three-dimensional virtual environment 410 may be indicated by the proximity of a virtual object to the avatar of its assignee (e.g., in a segment of the workspace 412 that is associated with the avatar). Similarly, unassigned issues may be indicated by displaying their associated virtual objects in a particular location or region in the three-dimensional virtual environment 410. For example, as shown in FIG. 4B, the virtual objects associated with unassigned issues may be displayed in a neutral region (e.g., one that is not otherwise associated with any particular participant), such as floating above the workspace 412. Other locations or regions for indicating the unassigned status of an issue (or indeed other techniques for indicating assignment status in the three-dimensional virtual environment 410) are also contemplated. For example, unassigned issues may be indicated by positioning the associated virtual objects in the center of the workspace 412. In such cases, the virtual objects may be moved from the center of the workspace, along a segment, towards the avatar of the assignee.

As described herein, assignment of issues to participants may be performed in a three-dimensional virtual environment by manipulating the virtual objects. For example, an issue may be assigned to a participant when the avatar takes physical possession of the associated virtual object. In the example of the three-dimensional virtual environment 410, an avatar may grasp a floating virtual object 422 and place it on a segment of the workspace 412 that is associated with them (or another participant), and the segment in which the virtual object is placed will determine the assignee of the associated issue.

Figure 11A:
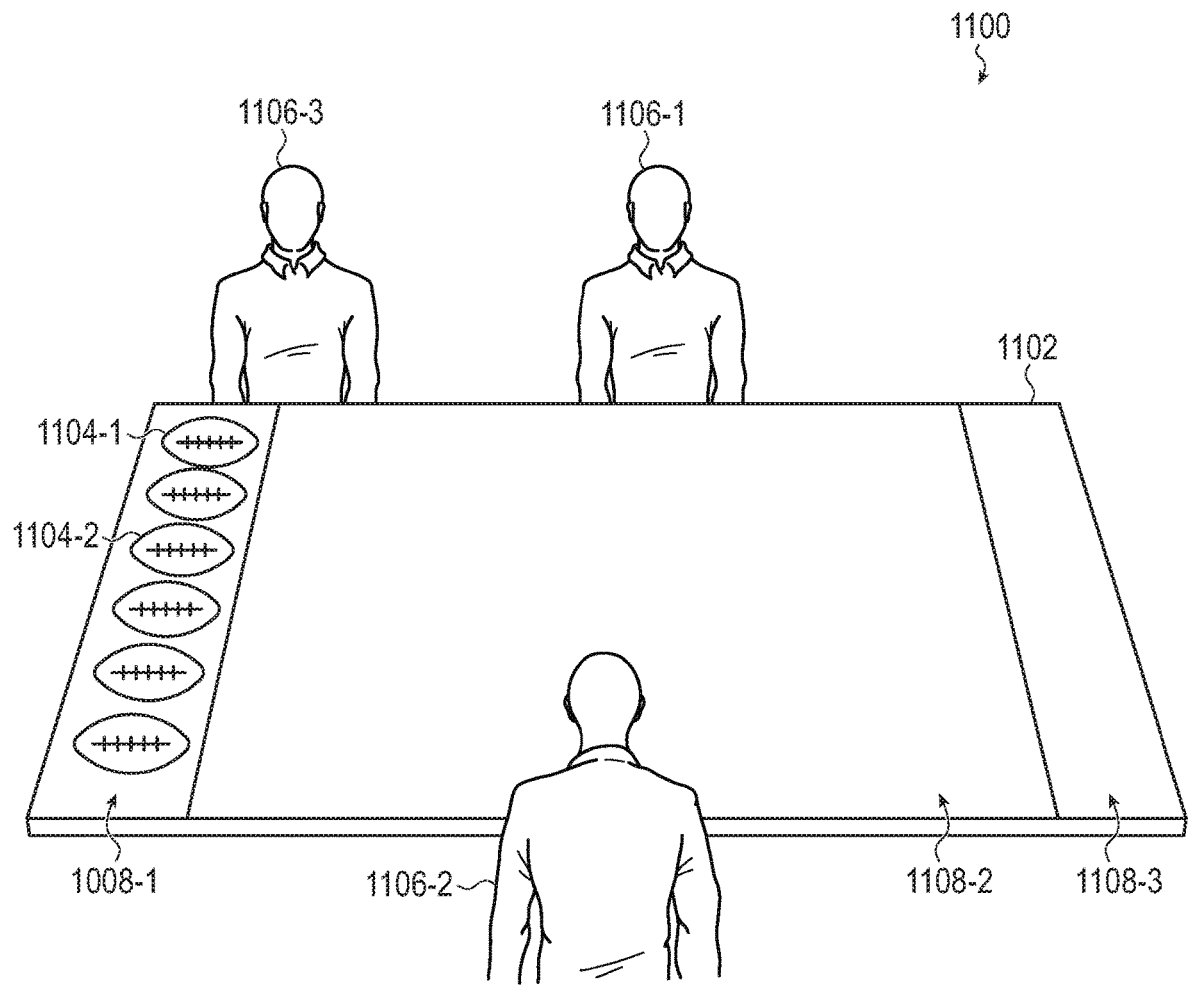
FIGS. 11A-11C depict an example three-dimensional virtual environment with a workspace represented as a sports field.
Figure 11B:
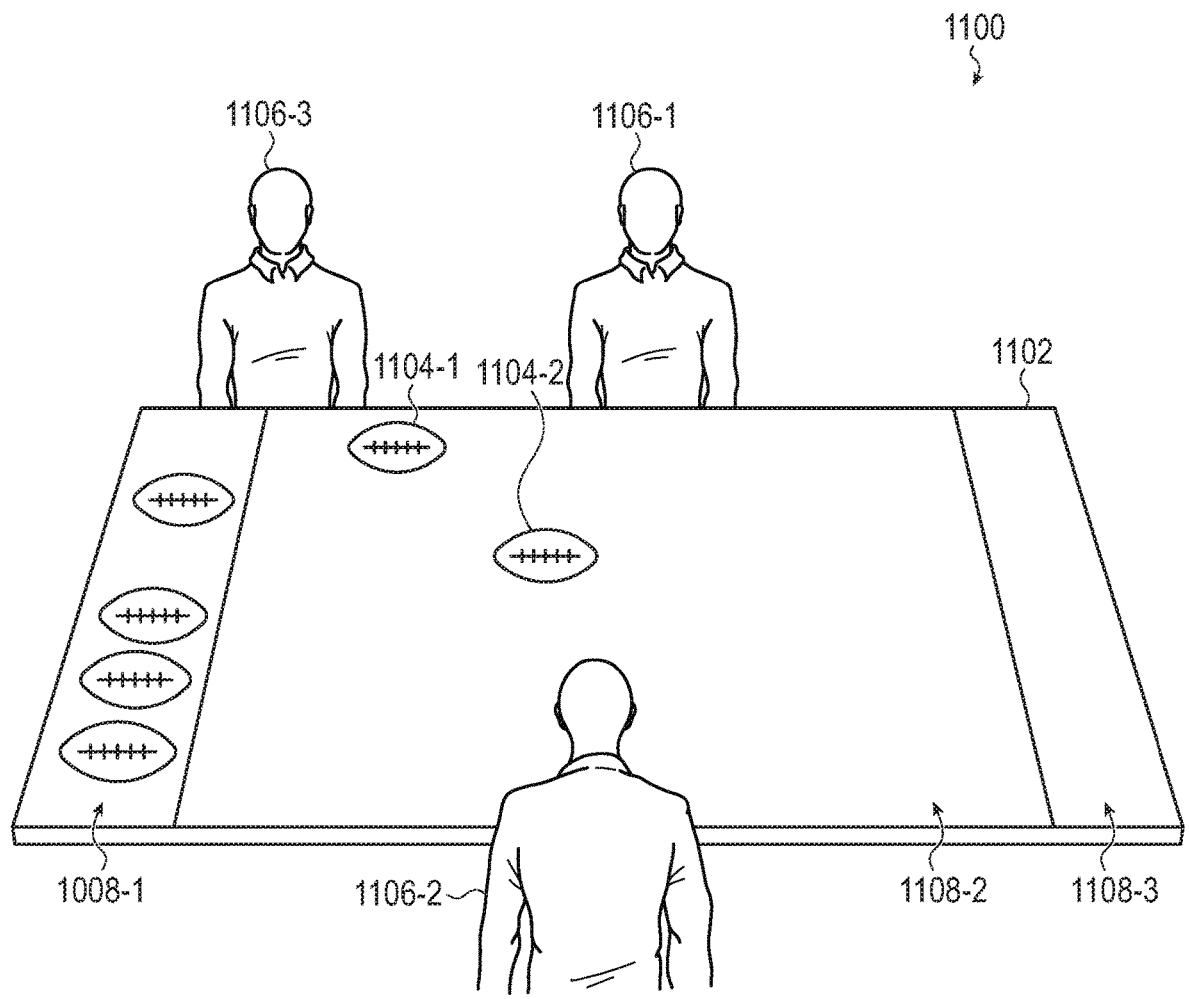
Figure 11C:
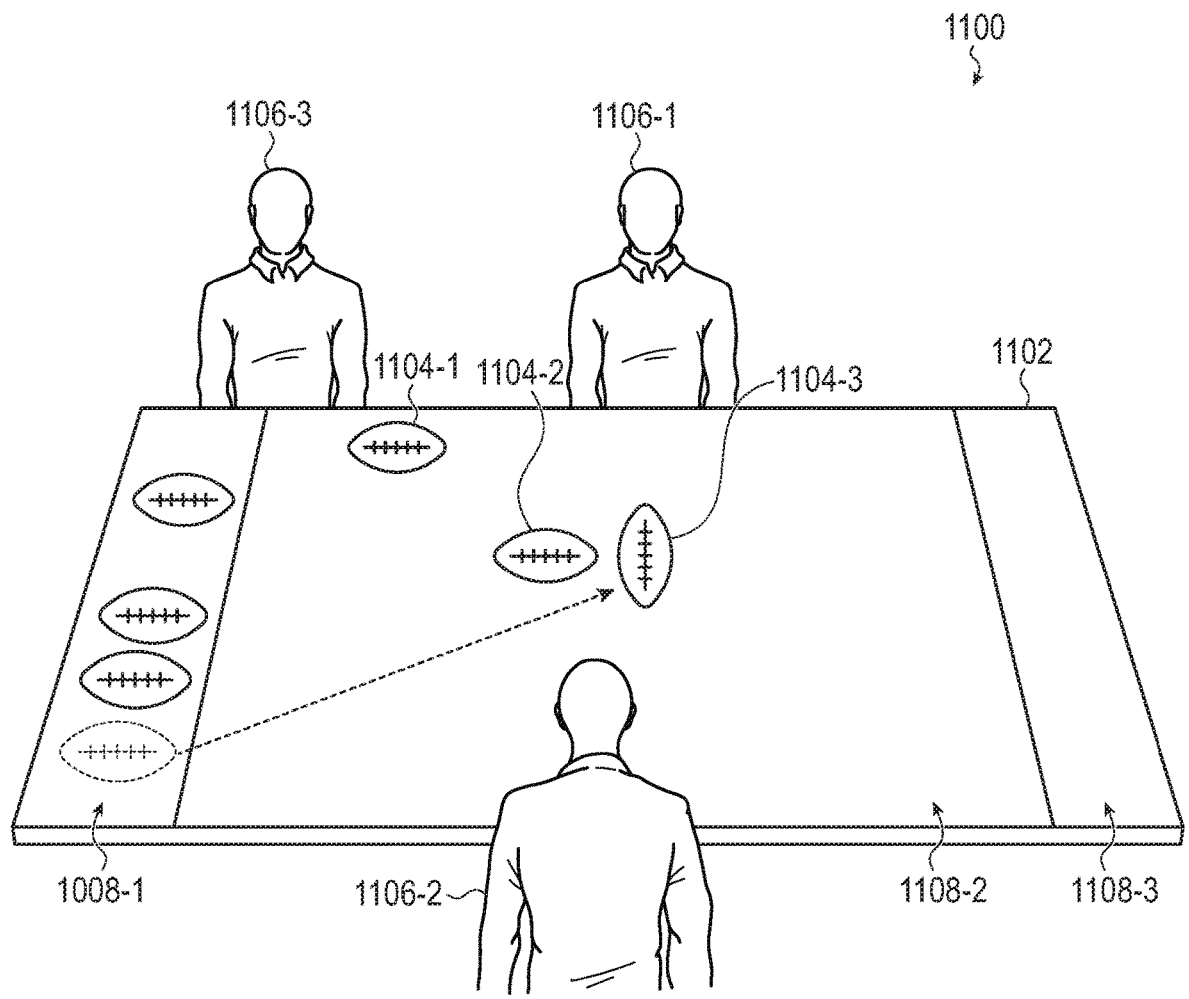

While FIGS. 4A-4B illustrate two example paradigms for the appearance of a three-dimensional virtual environment (and the mappings between issue attributes and parameters of the three-dimensional environment and objects), these are merely two examples, and other paradigms are also contemplated. For example, FIGS. 11A-11C illustrate a three-dimensional virtual environment in which the workspace represents a sports field and the virtual objects represent sports balls.

Figure 5A:
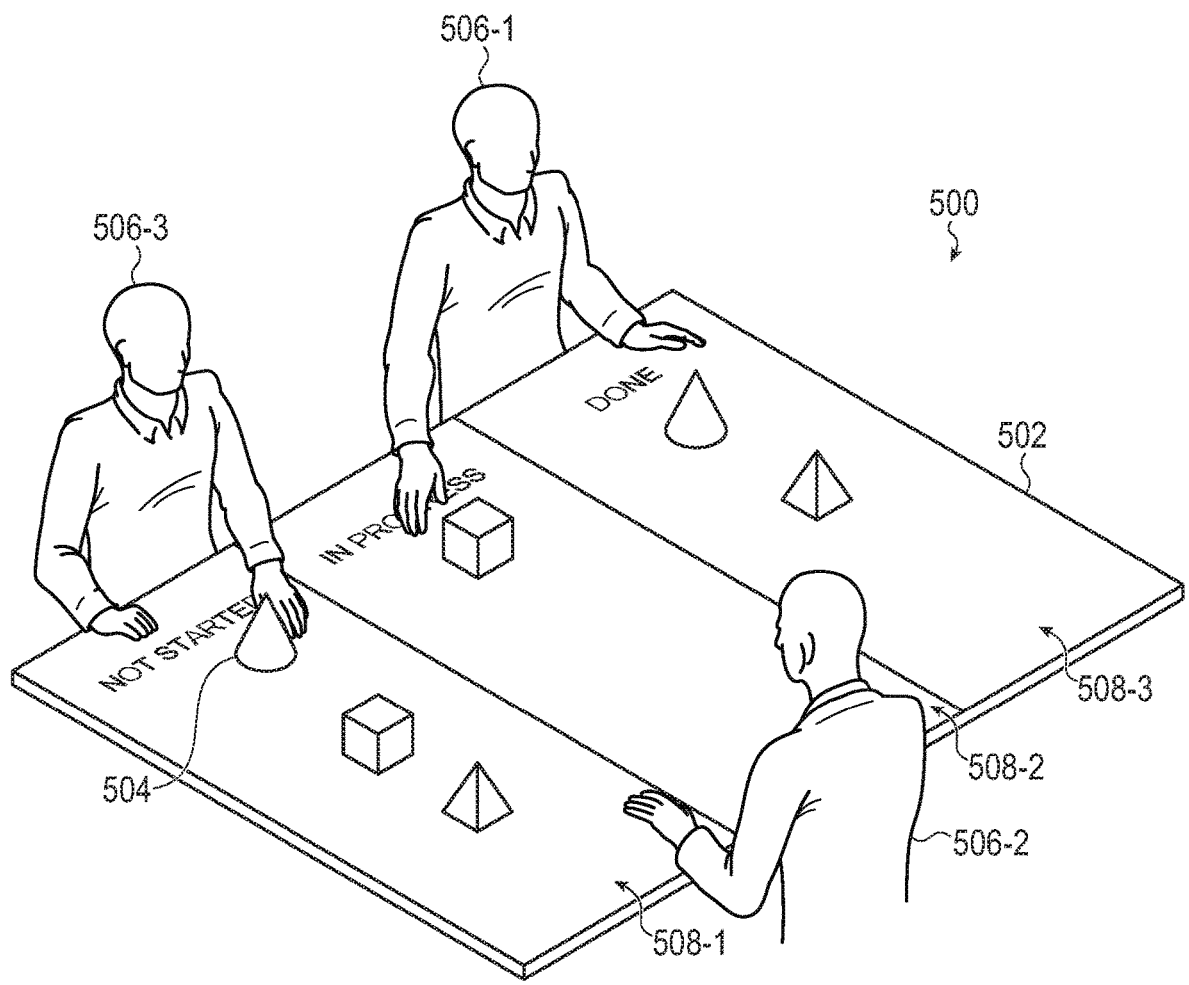
FIGS. 5A-5B depict issue status operations in a three-dimensional virtual environment.
Figure 5B:
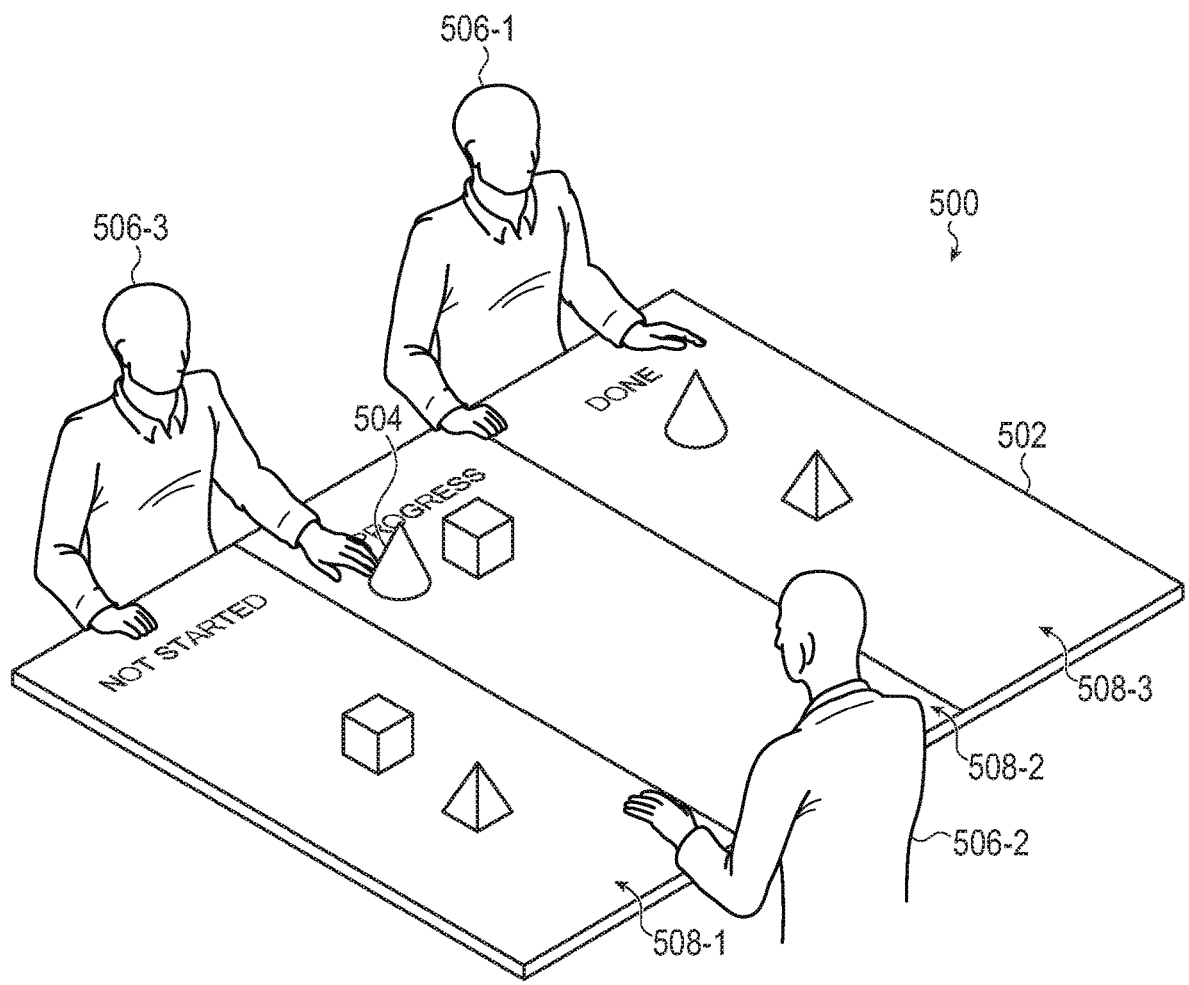

FIGS. 5A-5B illustrate an example virtual interaction with a virtual object in the three-dimensional virtual environment that is operable to advance an issue through a series of predefined statuses. FIGS. 5A-5B depict an example three-dimensional virtual environment 500 with a three-dimensional workspace 502, in which a virtual meeting with avatars 506-1, 506-2, and 506-3 is being conducted. As described with respect to FIG. 4A, the workspace 502 may define regions 508-1, 508-2, and 508-3, which may be analogous to the regions 408-1, 408-2, and 408-3. Moreover, virtual objects, such as virtual object 504, are displayed in the region of the workspace 502 that corresponds to their underlying issue status.

In order to advance or change a status of an issue during a virtual meeting in the three-dimensional virtual environment 500, a participant may perform a three-dimensional manipulation of an associated virtual object. For example, as shown in FIGS. 5A-5B, the avatar 506-3 may virtually grasp a virtual object 504 and move the virtual object 504 from the first region 508-1 (associated with a first issue status or other issue attribute) to the second region 508-2 (associated with a second issue status or other issue attribute). The manipulation may be performed by a participant's interaction with a controller (e.g., a controller 106, FIG. 1), a motion capture system, or other input system, while the participant is viewing the three-dimensional virtual environment via a head-mounted display (e.g., an HMD 107, FIG. 1) or other viewing system.

When the virtual meeting system detects the movement of the virtual object to (and/or placement of the virtual object in) a particular region of the workspace 502, the virtual meeting system may cause the status of the associated issue to change in accordance with the region in which the virtual object is placed. Thus, in the example of FIGS. 5A-5B, in the virtual meeting system, the issue associated with the virtual object is transitioned from a first issue status (e.g., "Not Started") to a second issue state (e.g., "In Progress").

While FIGS. 5A-5B depict an example in which the interaction with the virtual objects is a three-dimensional manipulation of the virtual object (e.g., virtually grasping and moving the virtual object), other types of interactions may also be used to move the virtual object within the three-dimensional virtual environment. For example, a user may tap on the virtual object 504 to select it or make it an "active" object, and then tap the target location. Upon receiving these inputs, the virtual meeting system may transition the issue status from a first status to a second status. Other techniques for selecting and/or indicating target locations of virtual objects are also contemplated.

FIGS. 5A-5B depict one example three-dimensional virtual environment and workspace in which the status advancement operations may be performed. The same or similar status advancement operations may be performed in other three-dimensional virtual environments and three-dimensional workspaces as well.

Figure 6A:
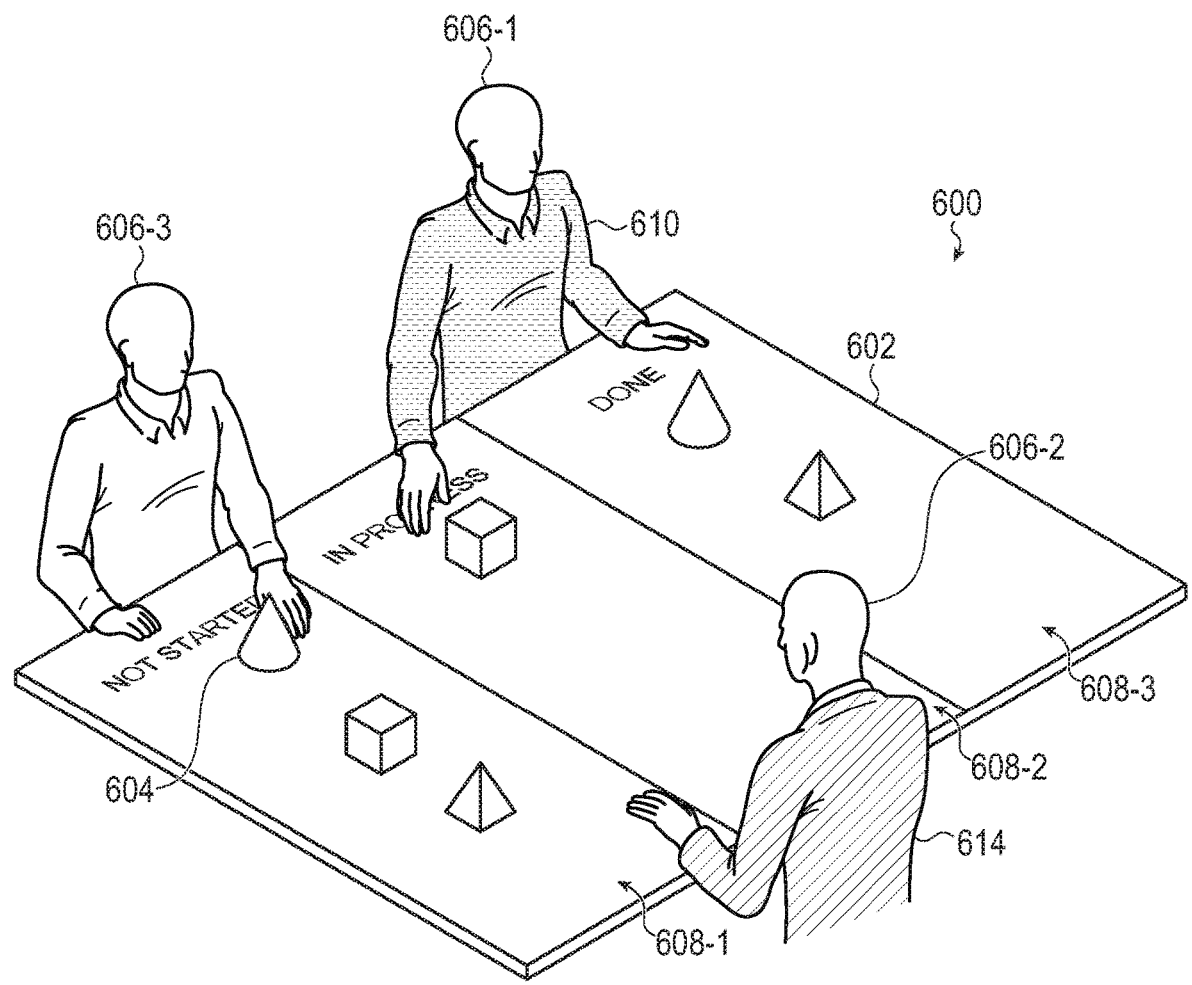
FIGS. 6A-6C depict issue assignment operations in a three-dimensional virtual environment.
Figure 6B:
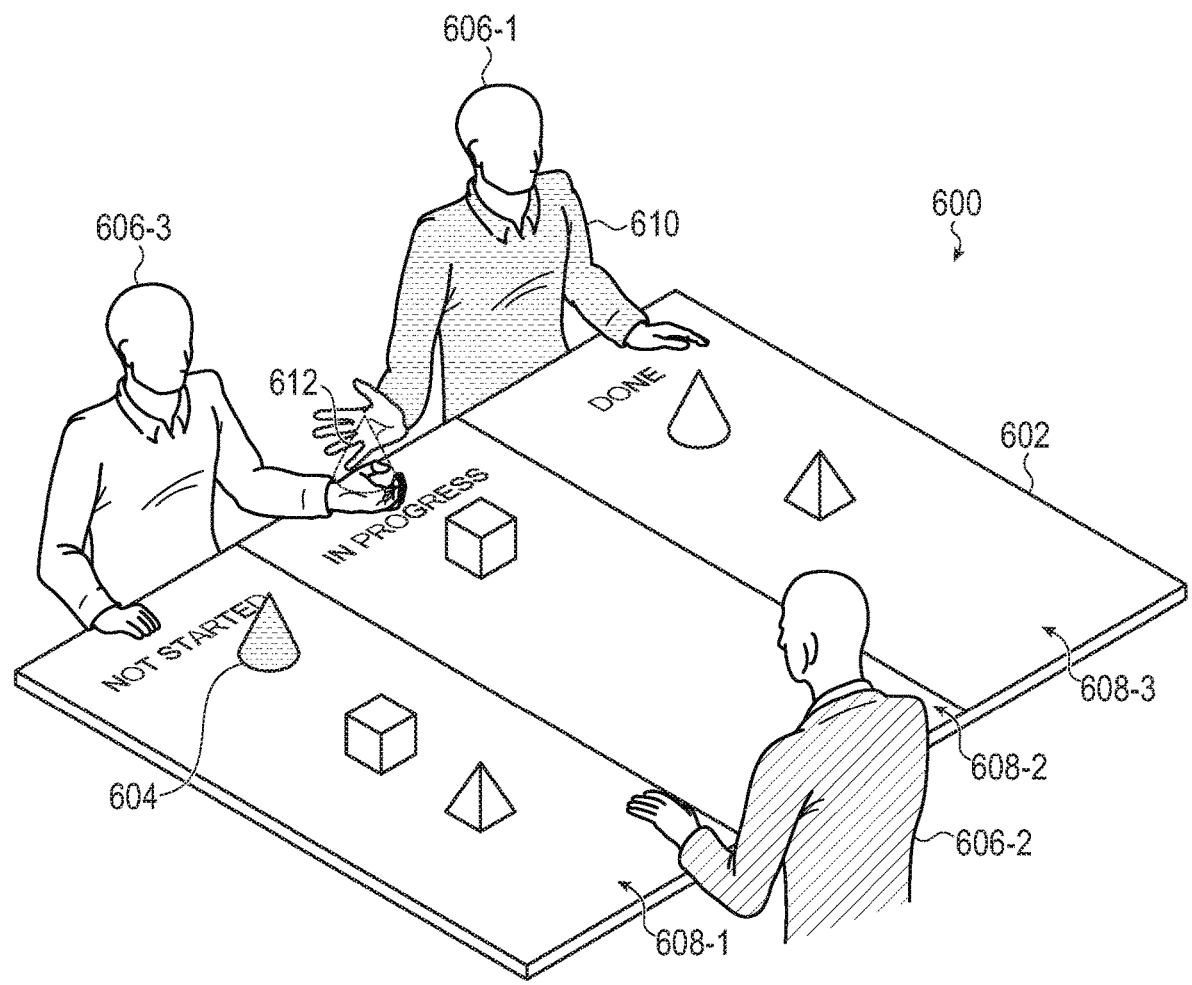
Figure 6C:
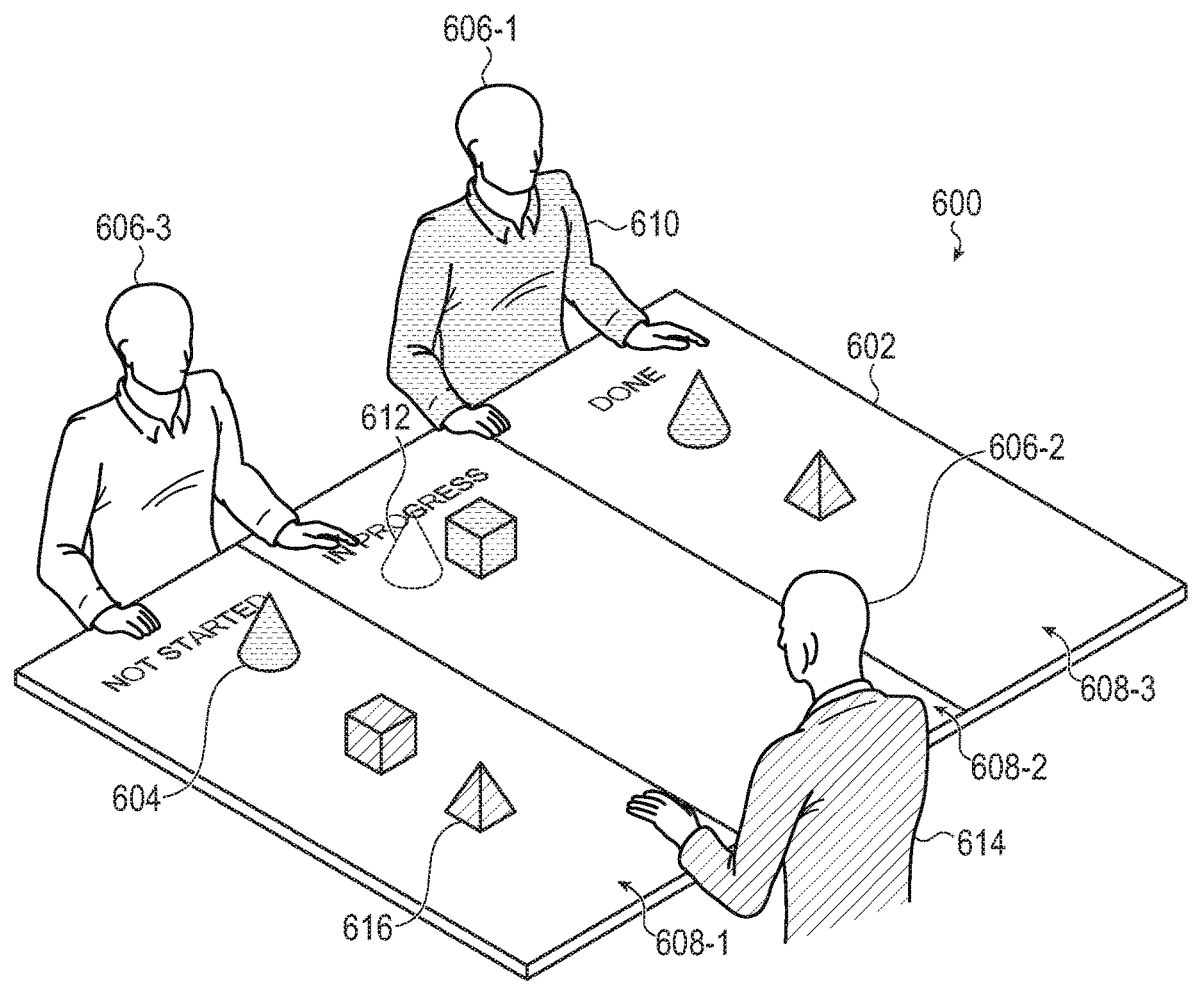

FIGS. 6A-6C illustrate an example interaction with a virtual object in the three-dimensional virtual environment that is operable to assign an issue to a participant of the virtual meeting. FIGS. 6A-6C depict an example three-dimensional virtual environment 600 with a three-dimensional workspace 602, in which a virtual meeting with avatars 606-1, 606-2, and 606-3 is being conducted. As described with respect to FIG. 4A, the workspace 602 may define regions 608-1, 608-2, and 608-3, which may be analogous to the regions 408-1, 408-2, and 408-3. Moreover, virtual objects, such as virtual object 604, are displayed in the region of the workspace 602 that corresponds to their underlying issue status.

In this example virtual meeting, the assignment status of an issue may be represented by a visible property of its representative virtual object. For example, FIG. 6C illustrates the three-dimensional virtual environment 600 when all of the virtual objects on the workspace 602 are assigned to meeting participants, and in which a visible property of the virtual object (here represented by a stippled appearance) matches a visible property of the avatar to which the underlying issue is assigned. More particularly, the virtual object 604 has a stippled appearance that matches a stippled appearance 610 (e.g., on an article of clothing) of the avatar 606-1, and the virtual object 616 has a striped appearance that matches a striped appearance 614 (e.g., on an article of clothing) of the avatar 606-2. By matching a visible property of the virtual objects to the avatars, the assignment status of issues can be quickly and easily visualized by meeting participants.

FIGS. 6A-6C illustrate one example visible property that may be used to indicate assignment status of issues. It will be understood that any visible property of a virtual object may be used to indicate assignment status in various embodiments. For example, the visible property may be a color, texture, shape, size, pattern, image, motion, or the like. In some cases, assignment status is indicated by a directional graphic that is displayed in conjunction with the virtual objects, such as an arrow displayed near a virtual object and pointing to the assignee, or a line that connects the virtual object and the avatar (e.g., a three-dimensional line, optionally animated to resemble an intermittent beam travelling towards the avatar of the assignee).

FIGS. 6A-6C also illustrate an example virtual interaction with a virtual object that may be operative to assign underlying issues to a meeting participant. For example, FIGS. 6A-6B illustrate the avatar 606-3 grasping the virtual object 604 (which is unassigned and has a visible property that does not match or correspond to any avatar) and handing the virtual object to the avatar 606-1. In some cases, a phantom object 612 illustrates the motion of the virtual object, while the virtual object 604 itself remains in the region of the workspace 602 that corresponds to its issue status, while in other cases, the virtual object 604 is shown being handed between avatars.

Once the avatar 606-1 accepts the virtual object 604, the virtual meeting system updates the issue record of the issue represented by the virtual object 604 to reflect the assignment to the avatar 606-1. In some cases, an affirmative input by a participant may be used to initiate the acceptance of the assignment, such that an avatar can pick up or otherwise interact with a virtual object without immediately causing it to be assigned to that participant. For example, the receiving avatar may place the virtual object in a region that indicates acceptance of the issue (e.g., virtual basket, box, or other differentiated region near the avatar), or by providing another input (e.g., clicking on a key or input button on a controller).

While FIGS. 6A-6B depict an example in which the interaction with the virtual objects is a three-dimensional manipulation of the virtual object (e.g., virtually grasping and handing the virtual object to another avatar), other types of interactions may also be used to assign an issue. For example, a user may tap on the virtual object 604 to select it or make it an "active" object, and then tap or point to the intended assignee. Upon receiving these inputs, the virtual meeting system may assign (or offer to assign) the issue to the identified participant. As another example, one avatar may throw a virtual object to another avatar. Other techniques for selecting and/or indicating target assignees of issues are also contemplated.

FIGS. 6A-6B depict one example three-dimensional virtual environment and workspace in which the assignment operations may be performed. The same or similar status assignment operations may be performed in other three-dimensional virtual environments and three-dimensional workspaces as well.

Figure 7A:
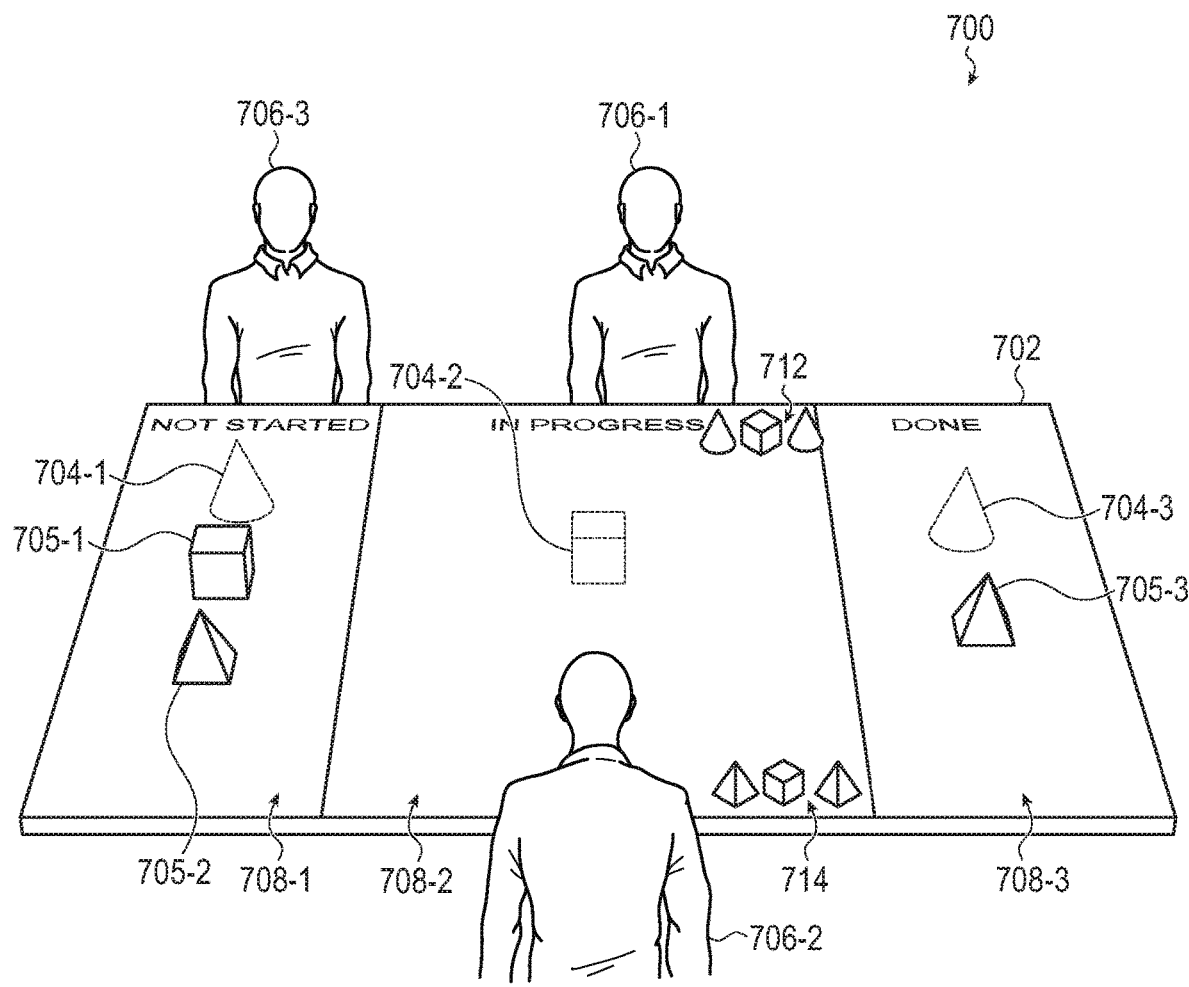
FIGS. 7A-7B depict viewing schemes for viewing assignment information in a three-dimensional virtual environment.
Figure 7B:
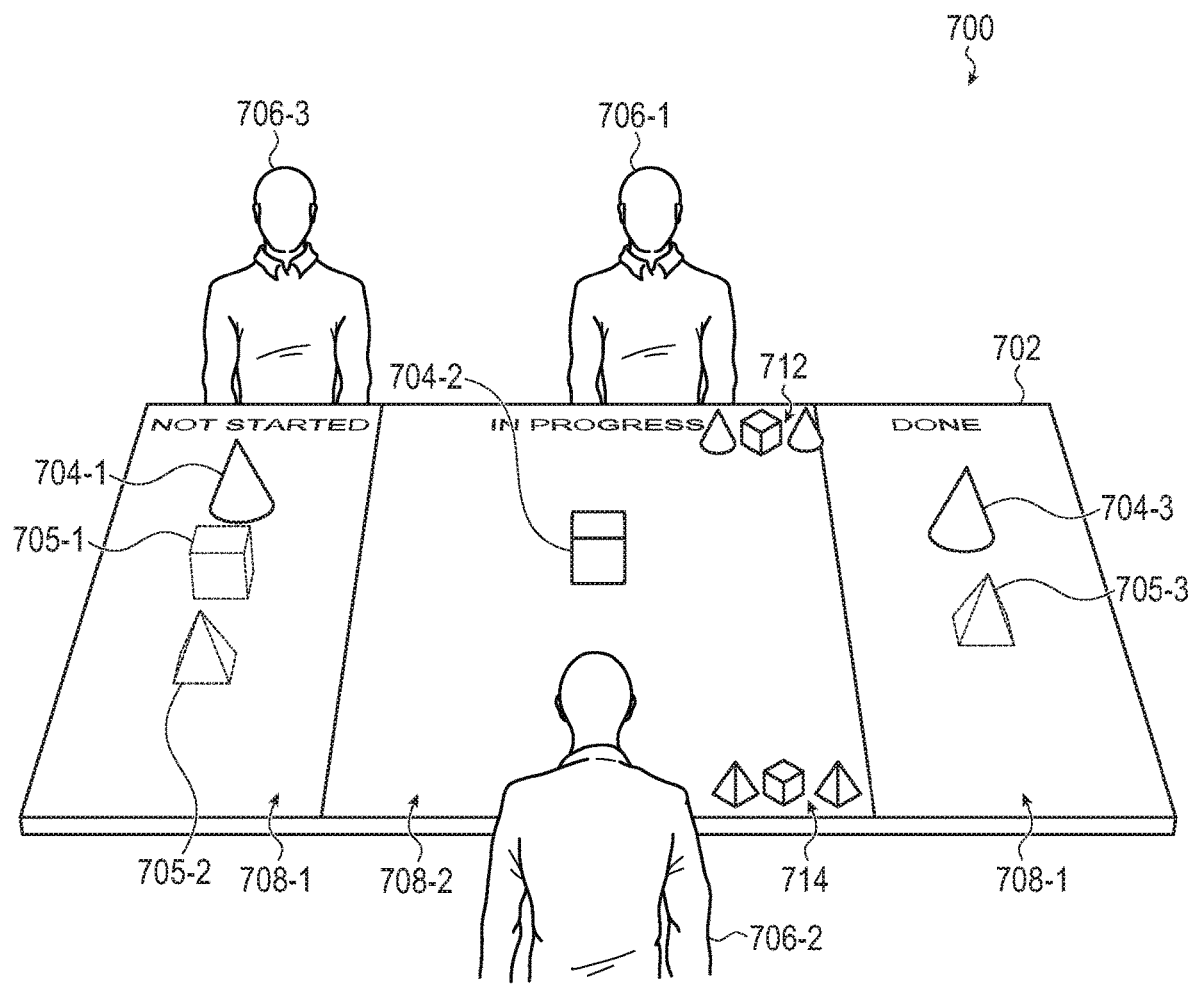

FIGS. 7A-7B illustrate another way in which issue assignments may be visualized in a three-dimensional virtual environment. In some cases, a workspace may include many virtual objects, and/or the virtual meeting may include many participants. In such cases, it may be difficult to quickly and efficiently identify which issues are assigned to a given participant. Accordingly, the three-dimensional virtual environment may be viewable in multiple viewing schemes that a user can select in order to view issues assigned to a given participant.

FIGS. 7A-7B depict an example three-dimensional virtual environment 700 with a three-dimensional workspace 702, in which a virtual meeting with avatars 706-1, 706-2, and 706-3 is being conducted. As described with respect to FIG. 4A, the workspace 702 may define regions 708-1, 708-2, and 708-3, which may be analogous to the regions 408-1, 408-2, and 408-3. Moreover, virtual objects, such as virtual objects 704 and 705 are displayed in the region of the workspace 702 that corresponds to their underlying issue status.

In one viewing scheme, all of the virtual objects 704, 705 may be displayed in accordance with a same visual style. For example, all of the virtual objects 704, 705 may be shown in a solid visual style (e.g., a solid three-dimensional object, as illustrated by virtual objects 705 in FIG. 7A). In this viewing scheme, the visual style of the virtual objects may not uniquely indicate who the assignee of any given issue is (though this information may be indicated or available in other ways).

In order to quickly see what issues are assigned to what participants, users may select a participant for whom they want to see assigned issues, and transition their view of the virtual environment to a different viewing scheme (e.g., an assignment-view viewing scheme). In this scheme, the virtual objects that are assigned to the selected participant may be displayed in one visual style (e.g., a solid three-dimensional object), while virtual objects that are assigned to participants other than the selected participant may be displayed in a different visual style (e.g., a wireframe three-dimensional object or a phantom object, as illustrated by virtual object 704-1 in FIG. 7A). In some cases, each participant may select a viewing scheme for their own experience, such that each participant can view the three-dimensional virtual environment 700 according to their own preference (e.g., at the same time that other participants are viewing the three-dimensional virtual environment 700 using a different viewing scheme).

FIG. 7A illustrates the three-dimensional virtual environment 700 in an assignment-view viewing scheme, in which a participant (e.g., corresponding to the avatar 706-2) has selected to view the issues assigned to itself. In this viewing scheme, the virtual objects 705 (which are the virtual objects associated with issues assigned to the avatar 706-2) are shown in a first visual style (e.g., solid three-dimensional object), and the virtual objects 704 (which are the virtual objects associated with issues assigned to one or more other avatars) are shown in a second visual style (e.g., a wireframe three-dimensional object).

FIG. 7B illustrates the three-dimensional virtual environment 700 in an assignment-view viewing scheme, in which a participant (e.g., corresponding to the avatar 706-2) has selected to view the issues assigned to another participant. In this viewing scheme, the virtual objects 704 (which are the virtual objects associated with issues assigned to the avatar 706-1) are shown in the first visual style (e.g., solid three-dimensional object), and the virtual objects 705 (which are the virtual objects associated with issues assigned to one or more other avatars) are shown in a second visual style (e.g., a wireframe three-dimensional object). It will be understood that FIGS. 7A and 7B may represent any participants' view of the three-dimensional virtual environment, depending on whether they have selected to view issues assigned to the avatar 706-2 (FIG. 7A) or assigned to the avatar 706-1 (FIG. 7B).

While FIGS. 7A-7B depict example visual styles in which the virtual objects may be depicted, other visual styles may be used. For example, any visible property of the virtual objects may be used to differentiate the visual styles (e.g., color, texture, shape, size, pattern, color saturation, transparency, etc.).

FIGS. 7A-7B also illustrate another way that issue assignments may be depicted in a three-dimensional virtual environment (which may be used alone or in conjunction with other techniques for visually distinguishing issue assignments). In particular, replicas 712, 714 of the virtual objects assigned to a given participant may be shown in front of (or otherwise in spatial proximity to) the avatar of its assignee. Thus, for example, replicas 714 of the virtual objects 705 (which may be smaller in size but maintain the proportions and other visible properties of the virtual objects 705) may be displayed in front of the avatar 706-2, and replicas 712 of the virtual objects 704 (which may be smaller in size but maintain the proportions and other visible properties of the virtual objects 704) may be displayed in front of the avatar 706-1. In this way, each participant can easily see what issues are assigned to what participants.

Figure 8:
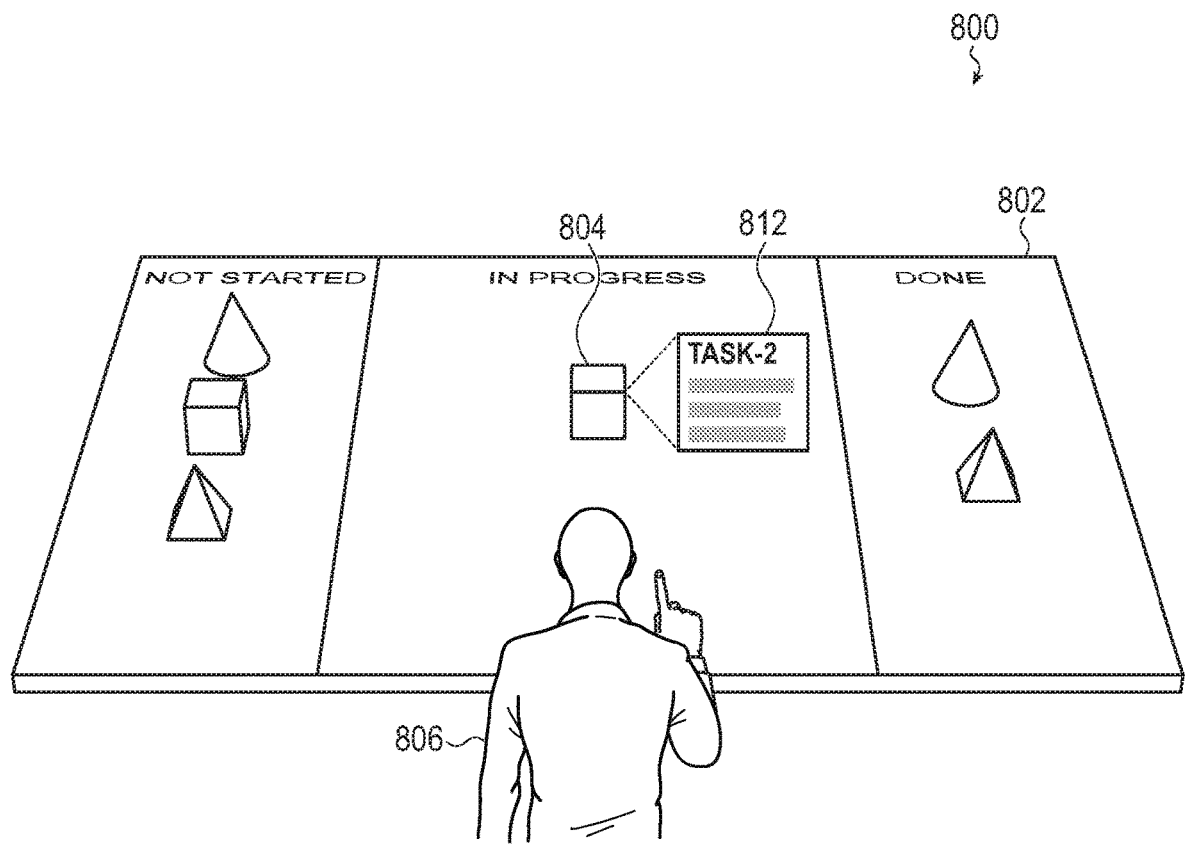
FIG. 8 depicts a three-dimensional virtual environment showing issue record data in association with a virtual object.

As described above, issues may be associated with various attributes, which may be stored in or at least partially define the issue records. In some cases, it is not feasible to represent each attribute of an issue record visually in a three-dimensional virtual environment. In some cases, issue records (or portions of issue records) may be viewable in a three-dimensional virtual environment in an unobtrusive way and without requiring a participant to exit the three-dimensional virtual environment. FIG. 8 illustrates an example three-dimensional virtual environment 800 and workspace 802 in which a participant (e.g., avatar 806) has selected a virtual object 804 in a manner that is indicative of an intent to view issue record data. For example, the avatar 806 has pointed to the virtual object 804. Other ways of selecting the virtual object are also contemplated, such as tapping the object, directing a cursor to the virtual object, or the like. Upon detecting the selection, the virtual meeting system will cause issue record data 812 to be displayed in conjunction with the virtual object 804. For example, the issue record data 812 may be shown in a text window that is visually linked to or otherwise visually associated with the virtual object 804. In other examples, the issue record data 812 may be shown directly on the virtual object itself. Other display techniques are also contemplated. The issue record data 812 may be visible to all participants, only to the participant who selected the virtual object 804, or a selected group of participants. The particular issue record data that is displayed may be all or any subset of the issue record data, and may be user selectable.

Figure 9A:
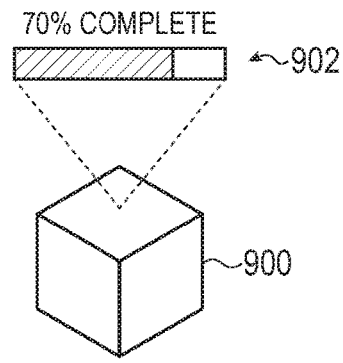
FIG. 9A depicts an example virtual object with a completion status indicator.

As described herein, an issue tracking system may track the progress of individual issues towards completion. This information may be stored in association with the issues (e.g., as part of the issue record), and may be visually represented in a three-dimensional virtual environment in various ways. FIG. 9A illustrates one way in which progress of an issue may be displayed. In this example, a progress bar 902 may be displayed in association with a virtual object 900, with the progress bar 902 indicating the completion percentage of the underlying issue. In other examples, the progress bar 902 may be displayed on the virtual object 900 itself. In yet other examples, progress is indicated in a different way. For example, the virtual objects 900 may be displayed as transparent or translucent three-dimensional objects that become "filled" or turn opaque according to their percent completion. Thus, a virtual object that appears "empty" may be 0% complete, and when it appears "full," it is 100% complete.

Figure 9B:
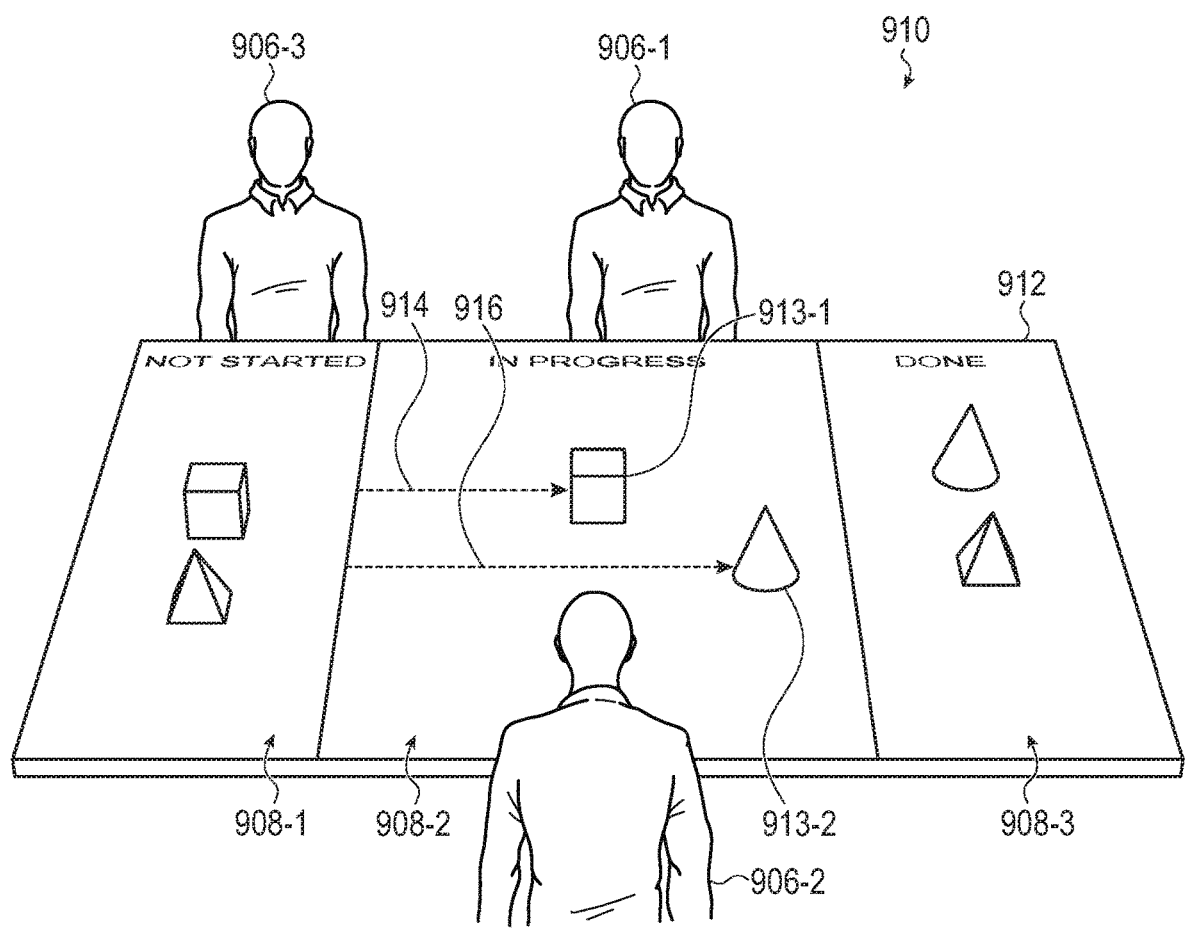
FIGS. 9B-9C depict an example three-dimensional virtual environment illustrating issue completion statuses based on location in a three-dimensional workspace.

In some cases, similar to the description of FIG. 4B above, a location of a virtual object in a workspace may indicate its completion percent. FIG. 9B depicts an example three-dimensional virtual environment 910 with a three-dimensional workspace 912, in which a virtual meeting with avatars 906-1, 906-2, and 906-3 is being conducted. As described with respect to FIG. 4A, the workspace 912 may define regions 908-1, 908-2, and 908-3. The regions 908-1 and 908-3 may be analogous to the regions 408-1 and 408-3 (e.g., virtual objects positioned in those regions have a status "Not Started" or "Done." respectively).

Figure 9C:
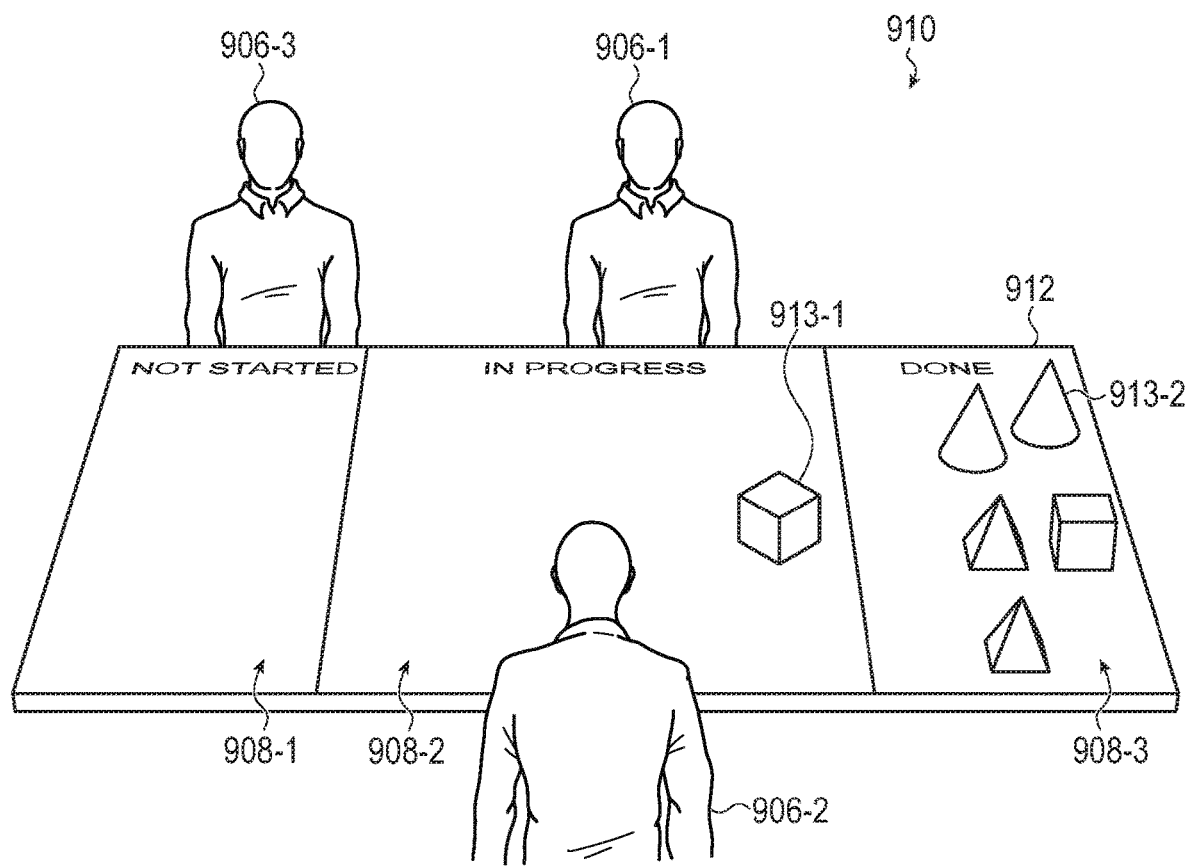

As shown in FIG. 9B, the position of a virtual object within the region 908-2 (relative to the regions 908-1 and 908-3) may be correlated with and/or correspond to the completion percentage of an issue. For example, the distance 914 of the virtual object 913-1 from the "Not Started" region and towards the "Done" region may correspond to the completion percentage of the issue represented by the virtual object 913-1 (e.g., around 50% as shown in FIG. 9B), and the distance 916 of the virtual object 913-2 from the "Not Started" region and towards the "Done" region may correspond to the completion percentage of the issue represented by the virtual object 913-2 (e.g., around 80% as shown in FIG. 9B). Participants may advance their issues along the region 908-2 to reflect the current completion percentage of a given issue. In another example, participants enter a completion percentage (e.g., via a keyboard or voice input), and the virtual meeting system positions the associated virtual object at the correct location in the region 908-2. FIG. 9C illustrate the three-dimensional virtual environment 910 after all virtual objects (and thus their associated issues) except for the virtual object 913-1 have been moved to the "Done" region 908-3. In this example, the size of the workspace 912 may have changed (e.g., become smaller) to represent the reduction in the number of outstanding issues that need to be completed in order to complete the project.

Figure 10A:
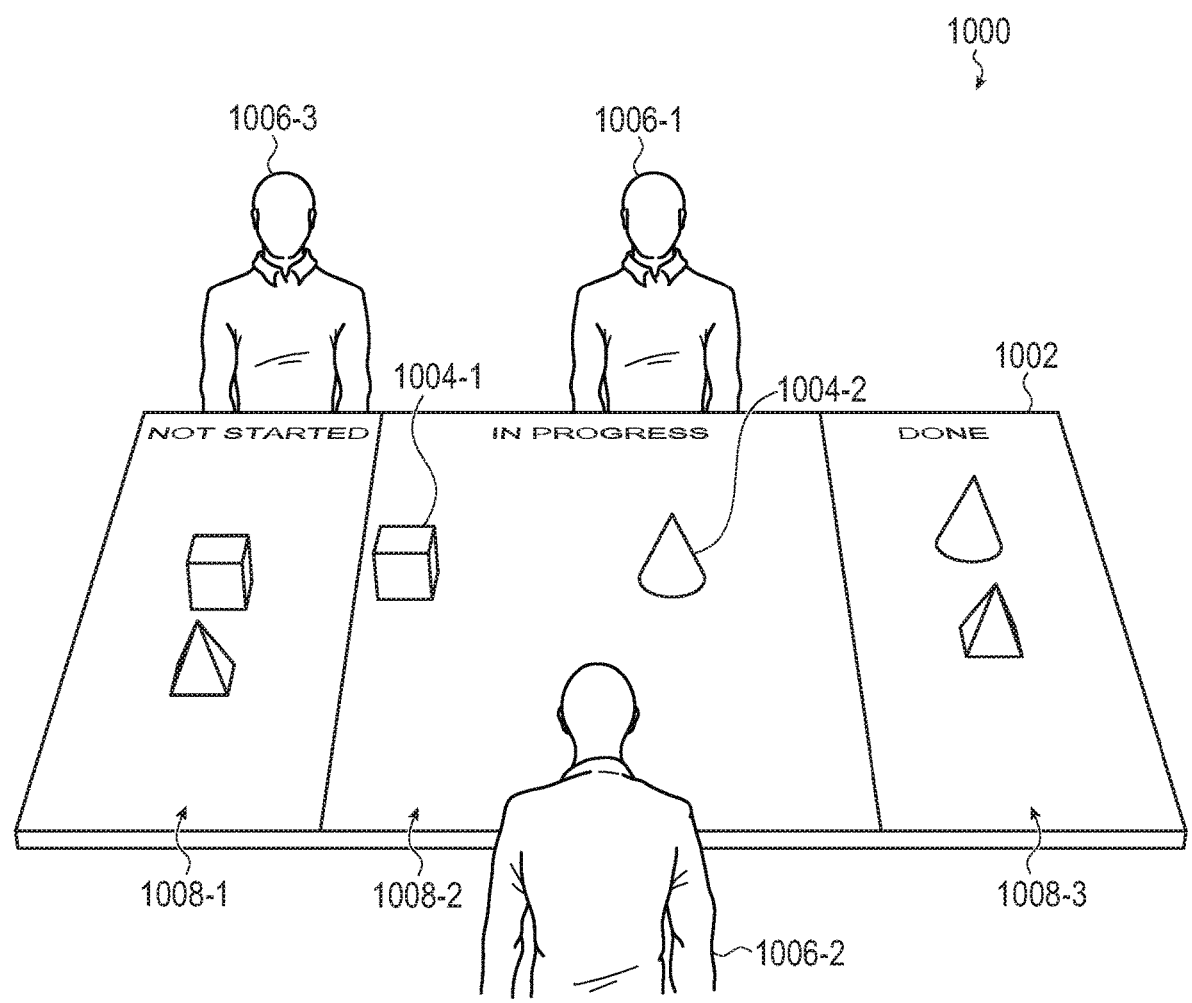
FIGS. 10A-10B depict an example three-dimensional virtual environment in which positional relationships between virtual objects represent logical relationships between issues.
Figure 10B:
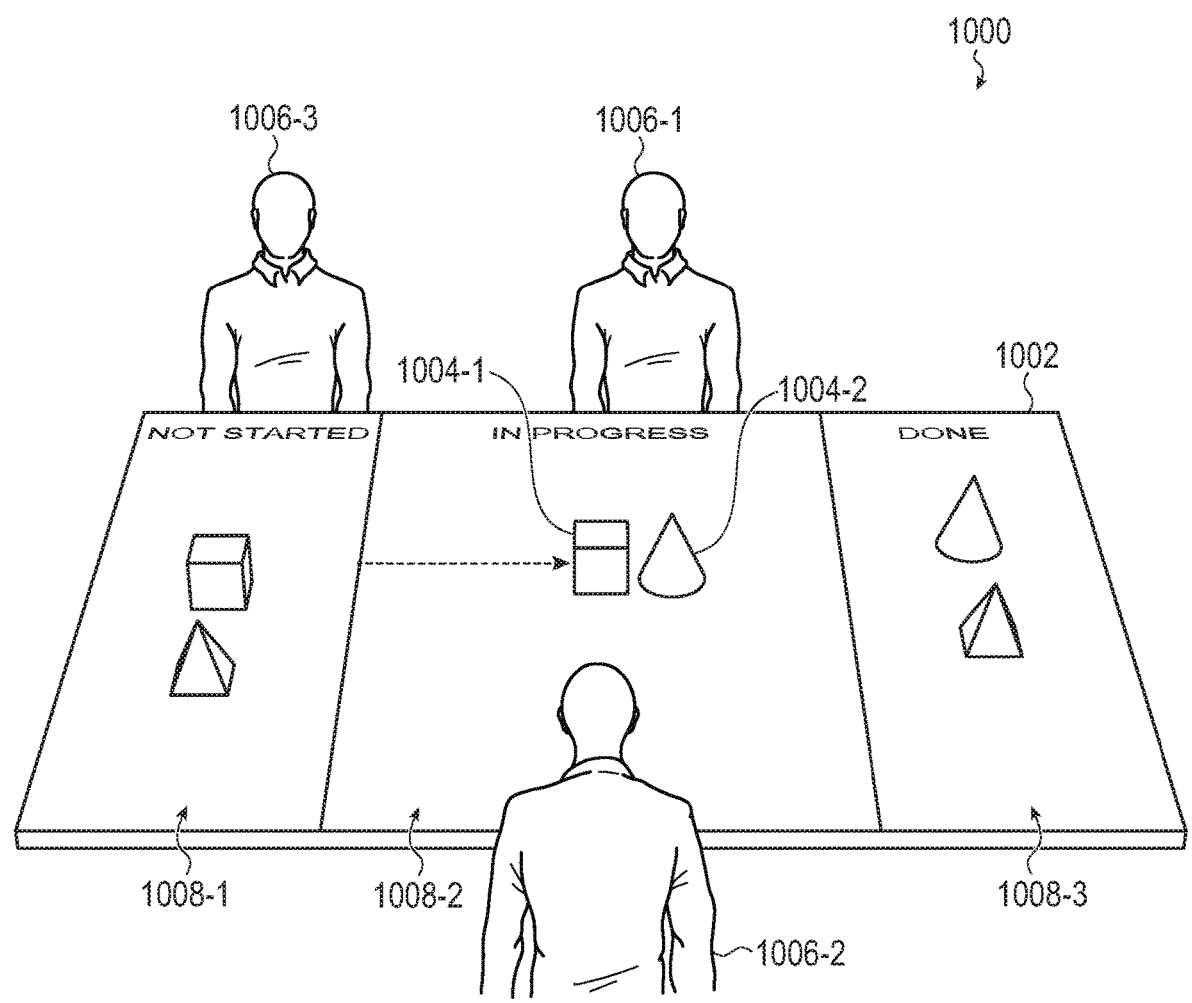

In some cases, issues in an issue tracking system have dependencies or are otherwise linked to other issues according to some relationship. One example dependency or link between issues may include a blocking relationship, in which a first issue cannot be started, completed, or advanced (e.g., past a certain completion percentage) until another issue is started, completed, or advanced (e.g., past a certain completion percentage). Other example dependencies or links include hierarchical dependencies, such as where one issue is composed of or includes multiple sub-issues or subtasks (e.g., parent-child relationships). Other example dependencies or links between issues are also contemplated.

Where issues may have dependencies or otherwise be linked to other issues, those dependencies and/or relationships may also be visually presented in a three-dimensional virtual environment. For example, FIGS. 10A-10B depict an example three-dimensional virtual environment 1000 with a three-dimensional workspace 1002, in which a virtual meeting with avatars 1006-1, 1006-2, and 1006-3 is being conducted. The workspace 1002 may define regions 1008-1, 1008-2, and 1008-3, which may be analogous to regions 908-1, 908-2, and 908-3 in FIGS. 9B-9C.

As shown in FIG. 10A, the virtual object 1004-2 is positioned in front of the virtual object 1004-1 along the progress path within the region 1008-1. This positioning represents a blocking relationship, in which the issue represented by the virtual object 1004-1 cannot be completed or advanced past a certain point until the issue represented by the virtual object 1004-2 is completed or advanced. FIG. 10B depicts the virtual object 1004-1 having been advanced as far as it can be until the issue represented by the virtual object 1004-2 is advanced or completed. This technique may provide quick and efficient visualization of the relative organization or workflow of a project. Other dependencies and relationships between issues may be depicted in other ways, such as with lines extending between virtual objects representing related issues (optionally with arrows indicating hierarchical relationships).

Dependencies, such as blocking relationships, between issues may be defined by interactions within the three-dimensional virtual environment. For example, a participant may place a virtual object in front of (or otherwise in a blocking relationship) relative to another virtual object, and the virtual meeting system may detect the virtual location of the two virtual objects and update the issue record(s) with the appropriate relationship. In some cases, if a virtual object of a blocking issue or a blocked issue is selected in order to retrieve additional information (e.g., as shown in FIG. 8), information about the blocking relationship is depicted in the virtual environment in association with the selected virtual object.

Additionally, blocking and other dependencies and relationships between issues may be depicted in other types of three-dimensional virtual environments and/or workspaces, such as workspaces that do not represent issue progress (e.g., completion percentage) by the position of the virtual objects.

FIGS. 11A-11C depict an example three-dimensional virtual environment 1100 with a three-dimensional workspace 1102, in which a virtual meeting with avatars 1106-1, 1106-2, and 1106-3 is being conducted. In this example, the workspace 1102 is represented as a sports field (e.g., rugby or football), and the virtual objects 1104 are represented by balls (e.g., rugby balls or footballs). The workspace 1102 may generally represent progress and/or status of issues in the manner of the workspace in FIGS. 9B-9C. The workspace 1102 may define regions 1108-1, 1108-2, and 1108-3, which may be analogous to regions 908-1, 908-2, and 908-3 in FIGS. 9B-9C. As shown in FIG. 11B, status and/or progress of issues may be represented by the position of the virtual objects 1104 in the workspace 1102, and participants may modify the issues by interacting with the virtual objects 1104 as described herein (e.g., by moving the virtual objects 1104 among the workspace 1102.

FIG. 11C illustrates how dependencies and relationships between issues may be depicted in the three-dimensional virtual environment 1102. In particular, a blocking issue (represented by virtual object 1104-3) may be positioned in front of the virtual object 1104-2 to indicate the blocking relationship. In some cases, a virtual object associated with a blocking issue may have a different appearance, such as the rotated virtual object 1104-3 in FIG. 11C. As described above, the virtual objects of issues that have blocking or other relationships may be depicted in this manner based on preexisting relationships, or the relationships may be defined or otherwise established by participant interactions with the three-dimensional virtual environment.

As noted above, a virtual meeting may be facilitated (at least in part) by or otherwise use a voice interface system, such as the voice interface system 110 in FIG. 1. In general, the voice interface system 110 may be adapted to receive voice inputs during a virtual meeting and determine actions to take in response to the voice inputs, and in some cases may be adapted to participate in the virtual meeting as a member or participant. In some cases, the voice interface system 110 is adapted to lead or direct the virtual meeting and may identify relevant discussion points and/or extract key data from discussion among the participants. In some implementations, the voice interface system 110 is also adapted to identify high-level or important issues that were discussed and actions that were taken during a virtual meeting and provide a summary or meeting notes summarizing the virtual meeting.

As shown in FIG. 1, the voice interface system 110 may be operably coupled to the host service 120 via a network 117. The voice interface system 110 may be adapted to receive audio from one or more of the participants of the virtual meeting and identify a set of issues and/or issue records that are predicted to be relevant to one or more topics discussed during the virtual meeting.

In one example described herein, the set of issue records is associated with issues or tasks of a particular project during a weekly or daily stand-up meeting. In other examples, another set of items is obtained from the host service, which may correspond to a set of discussion points, topics, or other items to be discussed during the virtual meeting.

As described herein, the voice interface system 110 may facilitate the virtual meeting by causing the display of a three-dimensional virtual environment to be modified in accordance with the discussion and/or specific voice commands issued during the virtual meeting. For example, the virtual objects displayed in the three-dimensional virtual environment may correspond to a current topic being discussed by the meeting participants. The voice interface system 110 may also cause elements of the various issues, tickets, or items represented by the virtual objects to be edited or modified in accordance with audio received during the virtual meeting. The modifications or proposed edits may be viewed and, in some cases, confirmed by one or more meeting participants through the three-dimensional virtual environment or another graphical user interface.

The voice interface system 110 may include various elements or components that may be adapted to perform the various functions associated with the voice interface system 110. In some examples, the voice interface system 110 includes an analyzer and a flow interactor that are adapted to extract data from live discussion provided during the virtual meeting and identify one or more relevant issue records that are associated with the content of the discussion. The flow interactor generally includes configurable components including rulesets for facilitating a particular type of meeting or meeting structure. For example, with respect to some of the embodiments described herein, the flow interactor may be adapted to facilitate a regular status update meeting in which various tickets or issue records are reviewed, modified, and updated using the virtual meeting system 109. In other examples, the flow interactor may be configured to facilitate anonymous feedback from a team or group during a virtual meeting. The flow interactor may also be configured to facilitate brainstorming meetings, group collaboration meetings, board meetings, or any other structured or partially structured meeting format that takes place in a three-dimensional virtual environment.

In general, the flow interactor includes a template flow for the virtual meeting that is conducted in accordance with a ruleset or meeting guidelines. In one example, the flow interactor includes a configurable module that is adapted to conduct a meeting in accordance with the processes described herein. While these are provided as sample illustrating examples, there are other meeting formats or structures for which the flow interactor may be configured to facilitate.

The flow interactor may be coupled to an analyzer, which may include a model that has been trained to analyze a data stream and identify one or more commands, actions, or tasks to be performed by the voice interface system 110 based on a received audio input. The analyzer may be adapted to perform semantic analysis, syntax analysis, tokenization, and other language processing functions. As described herein, the analyzer may include a machine learning algorithm that includes a Bayesian network, nodal network, or other predictive model that has been trained to correlate a text string or dataset with a particular command, task, action, or other function that is recognized by the issue tracking server(s) 122 of the host service 120. The analyzer may have a hard-coded model that remains static with use or, alternatively, the analyzer may adapt or modify the model over time to respond to common use cases and/or feedback received from the meeting participants or other system users.

The flow interactor, alone or in conjunction with the analyzer, may be configured to identify one or more related issue records stored in the database 124 associated with the issue tracking server 122. The flow interactor may work in conjunction with the analyzer to interpret speech and voice commands received during a virtual meeting in order to effectuate changes to a set of issues that is identified as being relevant to the discussion during the live meeting. The flow interactor may also work in conjunction with the model 126 of the host service 120, which may include high-level data, modal graphs, and other structural data that can be used to navigate and locate the various issue records stored in the database 124 of the host service 120.

The analyzer and/or the flow interactor may be configured to receive an analyzed dataset (e.g., a text string) that is based on audio received from the voice analyzer. The analyzer may be configured to further analyze the dataset received from the voice analyzer to extract key terms and/or phrases. The analyzer may, in some instances, be configured to perform natural language processing in order to remove common terms or other language that may not be unique to the topic being discussed. The analyzer may perform further processing in order to identify one or more of: a topic being discussed, a user being discussed, an activity associated with the topic, or an action to be performed.

The analyzer may analyze the dataset using one or more natural language processing tools. For example, the dataset may be analyzed (and, optionally, normalized, lemmatized, parsed, segmented, part-of-speech tagged, stemmed, or otherwise preprocessed) to determine whether statistical inferences can be derived from the dataset. In one embodiment, text content derived from, or otherwise obtained from, audio received during the live meeting (as processed by the voice analyzer) can be segmented by words, phrases, or sentences to determine which content occurs most frequently. In many examples, text content from, or otherwise obtained from, the dataset and predicted to not be unique to a current topic of discussion can be likewise segmented by words, phrases, or sentences and extracted or ignored. In some implementations, the analyzer may include a semantic analysis engine to identify specific phrasing or sentence structure that may include a specific action or type of input that is provided; leverage a text preprocessing analysis engine to tokenize, lemmatize, normalize, or otherwise simplify words of the voice input, to remove certain characters or phrases (e.g., newlines or stop words), and so on in order to generate a bag of words, bag of parts of speech, or any other numerical statistic(s) or metadata (e.g., length of text, number of sentences, number of tokens, lemma types) that may be compared to a database of previously-identified actions or commands.

The analyzer may include or use a predictive model that may be adapted to extract or infer patterns within the dataset or text received from the voice analyzer. For example, the analyzer can utilize any number of suitable techniques to identify signals of such patterns. Examples include, but may not be limited to, techniques including or leveraging: classification algorithms; supervised learning algorithms; probabilistic classification algorithms; Bayesian analysis algorithms; support vector machines; neural networks; deep-learning algorithms; decision trees; natural language processing algorithms; hierarchies of experts; Kalman filters; entropy-based models; and the like.

In this manner, a set of terms and phrases (collectively, herein "keywords" also referred to as a dataset or analyzed text) can be created by the analyzer in which certain keywords used in a current discussion topic are associated with a statistical likelihood that a related issue request or issue record may exist. The analyzer may, in cooperation with the flow interactor and the issue tracking server(s) 122 of the host service 120, identify one or more issue records to be viewed and/or modified in accordance with the topic being discussed. Similarly, the analyzer, in conjunction with the flow interactor, may determine or compute a statistical likelihood that no related issue record exists and that a new issue record should be created. In one example, the analyzer and/or flow interactor uses the keywords to identify an epic or story issue record that relates to a general topic, project, long term goal, or other construct that corresponds to a set of issue records associated with each other in the issue tracking server(s) 122, and creates or causes the creation of a new issue record having data extracted from or based on the epic or story issue record.

The flow interactor and/or the analyzer may, in some cases, be operably coupled to the model 126 of the host service 120 in order to identify a corresponding issue record stored in the database 124 associated with the issue tracking server(s) 122. In one example, the flow interactor, alone or in conjunction with the analyzer, analyzes the data stream received from the voice analyzer in order to identify one or more keywords, phrases, or other attributes of the audio of a virtual meeting. The flow interactor, in conjunction with the model 126, may determine a similarity score, similarity metric, or other criteria with respect to the attributes of the live discussion and one or more issue records or tickets stored in the database 124. The similarity score may be a composite of multiple correlations including one or more of the following: a correlation between the speaker in the live meeting and an assignee of the issue record; a correlation between a keyword extracted from the dataset and a description or title of the issue record; a correlation between a keyword or topic extracted from the dataset and a name or description of a project, story, or epic associated with an issue record. The flow interactor may determine a composite metric based on these factors and, in response to the metric satisfying a threshold, identify one or more corresponding issue records.

When the voice interface system 110 detects that a certain voice input detected during a virtual meeting includes a command that is relevant to an operation that is permissible or possible in the virtual meeting (e.g., changing an issue status, assigning an issue, changing a view scheme, viewing an issue record, changing an issue completion percent, changing a relationship or dependency between issues, etc.), the voice interface system 110 causes the requested operation to be completed.

Figure 12:
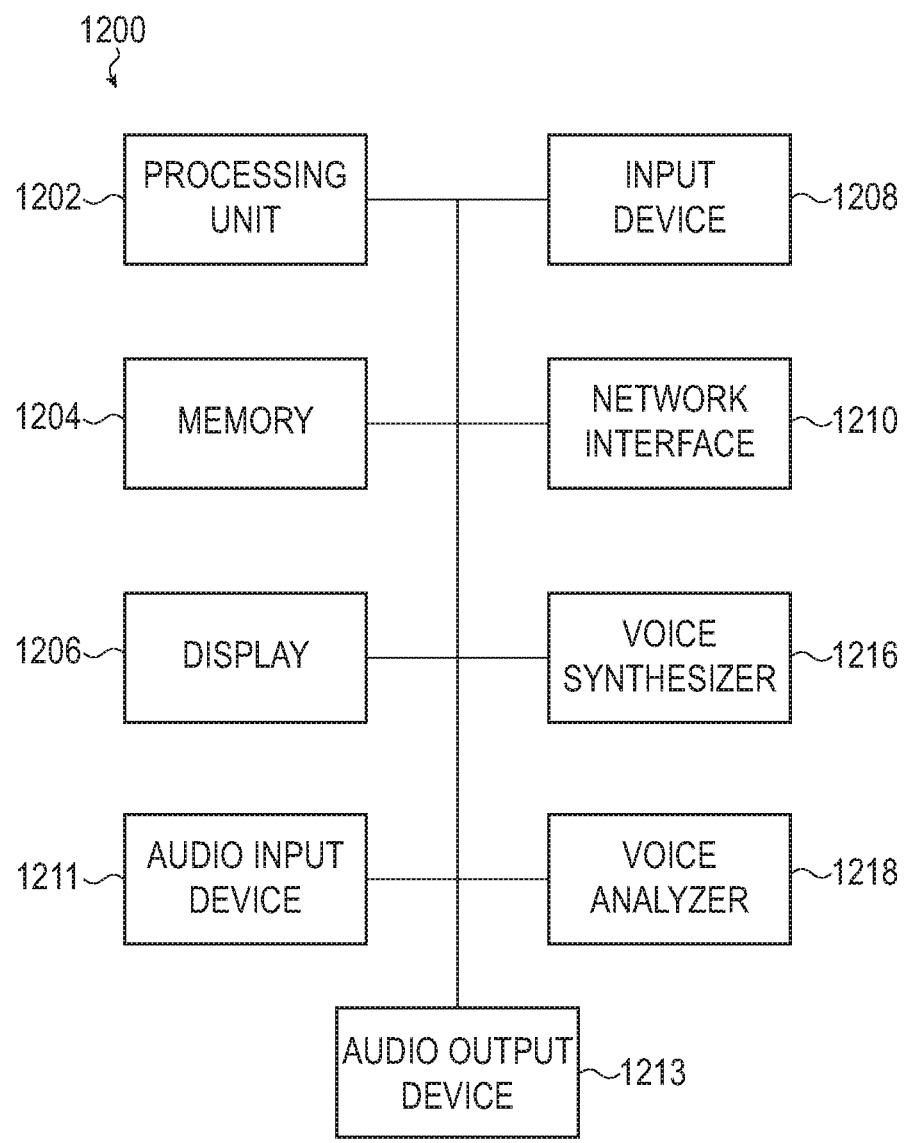
FIG. 12 depicts an example hardware configuration of a virtual meeting system.

FIG. 12 depicts an example schematic diagram of a device 1200. By way of example, the device 1200 of FIG. 12 may correspond to the virtual meeting system 109, the host service 120, the client devices 105, the HMDs 107, or any other electronic devices described herein. To the extent that multiple functionalities, operations, and structures are disclosed as being part of, incorporated into, or performed by the device 1200, it should be understood that various embodiments may omit any or all such described functionalities, operations, and structures. Thus, different embodiments of the device 1200 may have some, none, or all of the various capabilities, apparatuses, physical features, modes, and operating parameters discussed herein.

As shown in FIG. 12, a device 1200 includes a processing unit 1202 operatively connected to computer memory 1204. The processing unit 1202 may be operatively connected to the memory 1204 components via an electronic bus or bridge. The processing unit 1202 may include one or more computer processors or microcontrollers that are configured to perform operations in response to computer-readable instructions. The processing unit 1202 may include the central processing unit (CPU) of the device. Additionally or alternatively, the processing unit 1202 may include other processors within the device including application specific integrated chips (ASIC) and other microcontroller devices.

The memory 1204 may include a variety of types of non-transitory computer-readable storage media, including, for example, read access memory (RAM), read-only memory (ROM), erasable programmable memory (e.g., EPROM and EEPROM), or flash memory. The memory 1204 is configured to store computer-readable instructions, sensor values, and other persistent software elements. The memory 1204 may also include a variety of types of non-transitory computer-readable storage media including, for example, a hard-drive storage device, a solid-state storage device, a portable magnetic storage device, or other similar device. The memory 1204 may also be configured to store computer-readable instructions, sensor values, and other persistent software elements.

In this example, the processing unit 1202 is operable to read computer-readable instructions stored on the memory 1204. The computer-readable instructions may be provided as a computer-program product, software application, client application, issue tracking client application, and so on.

As shown in FIG. 12, the device 1200 also includes a display 1206. The display 1206 may include a liquid-crystal display (LCD), an organic light emitting diode (OLED) display, a light emitting diode (LED) display, or the like. If the display 1206 is an LCD, the display 1206 may also include a backlight component that can be controlled to provide variable levels of display brightness. If the display 1206 is an OLED or LED type display, the brightness of the display 1206 may be controlled by modifying the electrical signals that are provided to display elements. The display 1206 may correspond to any of the displays shown or described herein, such as the display of the terminal device 102 (FIG. 1), display components in head-mounted displays 107, or other displays that are used to display a three-dimensional virtual environment and/or graphical user interface in accordance with the embodiments described herein.

In some embodiments, the device 1200 includes one or more input devices 1208. An input device 1208 is a device that is configured to receive user input. The one or more input devices 1208 may include, for example, a rotatable input system, a push button, a touch-activated button, a keyboard, a key pad, a directional pad, motion sensing devices, motion capture devices, or the like (including any combination of these or other components). In some embodiments, the input devices 1208 may be part of or provided on an HMD 107, a controller 106, a client device 105, or any other electronic device described herein.

The device 1200 may also include a network interface 1210 that is configured to transmit and/or receive signals or electrical communication from an external or separate device. The network interface 1210 may be configured to couple to an external device via a cable, adaptor, or other type of electrical connector. In some embodiments, the network interface 1210 may be used to couple the device 1200 to other devices in a system such as the system 100.

The device 1200 may also include an audio input device 1211 and an audio output device 1213. The audio input device 1211 may include a microphone or other audio or acoustic sensor that is configured to detect an audio or voice input, in accordance with embodiments described herein. The audio input device 1211 may also include signal processing circuitry including, for example, an analog to digital converter, one or more signal filtering circuits, and the like. The audio output device 1213 may include a speaker or other device configured to produce an audio output. In accordance with the embodiments described herein, the audio output device 1213 may be configured to produce an audio output that is recognizable as speech or voice output. The audio output device may include associated drive circuitry including, for example, digital to analog converters, signal amplifiers, cross-over circuits, filters, and the like.

The device 1200 may also include a voice synthesizer 1216. As described herein, the voice synthesizer 1216 may include hardware and software elements or components that are configured to produce an audio signal corresponding to a speech or voice output in response to a dataset or text string. In some implementations, the voice synthesizer 1216 includes one or more text-to-speech (TTS) components that are configured to convert a text string into an audio signal that is recognizable by a user as speech. The voice synthesizer 1216 may include one or more modules or software developer kits that implement one or more of the TTS protocols or elements, as described herein.

The device 1200 may also include a voice analyzer 1218. As described herein, the voice analyzer 1218 may include hardware and software elements or components that are configured to produce a dataset or text string in response to an audio signal or voice input. In some embodiments, the voice analyzer 1218 implements a Hidden Markov Model (HMM) that divides the audio stream or signal into fragments for which one or more coefficients or vectors is computed. The series of coefficients or vectors may be matched to one or more phonemes or units of speech, which may be used to determine corresponding text. The voice analyzer 1218 may include one or more modules or software developer kits that implement one or more of the voice-to-text protocols or elements. The voice analyzer 1218 may perform the voice-to-text processing using a synchronous, asynchronous, streaming, or other architecture for processing audio or voice input.

While the device 1200 is described as having a particular set of components, the device 1200 is not limited to only those components described herein. For example, a device may include more than one of the components described with respect to FIG. 12 or elsewhere in the instant application, and may indeed include other components not described herein.

It is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, one may appreciate that, although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A method of facilitating a virtual meeting using virtual interactions with three-dimensional virtual objects to change statuses of issues being tracked by an issue-tracking system, the method comprising:
    identifying, in the issue-tracking system, a set of issues to be represented in the virtual meeting, the set of issues including:
        a first issue associated with a first issue record indicating a current status of the first issue, the current status of the first issue indicating a progress of the first issue through a predetermined sequence of issue statuses; and
        a second issue associated with a second issue record indicating a current status of the second issue, the current status of the second issue indicating a progress of the second issue through the predetermined sequence of issue statuses;
    retrieving, from the issue-tracking system, the current status of the first issue and the current status of the second issue;
    causing a three-dimensional virtual environment to be displayed to a first user and a second user, the three-dimensional virtual environment comprising:
        a representation of the first user;
        a representation of the second user;
        a representation of a three-dimensional workspace; and
        a set of virtual objects including:
            a first virtual object displayed in the three-dimensional workspace and representing the first issue in the issue-tracking system, wherein a location of the first virtual object in the three-dimensional workspace corresponds to the current status of the first issue; and
            a second virtual object displayed in the three-dimensional workspace and representing the second issue in the issue-tracking system, wherein a location of the second virtual object in the three-dimensional workspace corresponds to the current status of the second issue;
    receiving, from the first user, a first three-dimensional interaction with the first virtual object, the first three-dimensional interaction causing the first virtual object to be offered to the second user within the three-dimensional virtual environment;
    receiving, from the second user, a second three-dimensional interaction with the first virtual object, the second three-dimensional interaction corresponding to an acceptance, by the second user, of the first virtual object; and
    in response to the acceptance, by the second user, of the first virtual object, causing the issue-tracking system to assign the first issue to the second user, wherein:
    the three-dimensional virtual environment is selectively viewable, by each of the first user and the second user, in:
        a first viewing scheme in which a first subset of virtual objects, of the set of virtual objects, that are associated with issues that are assigned to a particular user are visually differentiated from a second subset of virtual objects, of the set of virtual objects, that are associated with issues that are assigned to users other than the particular user; and a second viewing scheme in which each virtual object of the set of virtual objects is displayed in a same visual style; and
in response to a selection, by the first user, of the first viewing scheme and a selection, by the second user, of the second viewing scheme, contemporaneously causing the three-dimensional virtual environment to be displayed to the first user according to the first viewing scheme and to the second user according to the second viewing scheme.

2. The method of claim 1, further comprising:
in response to receiving the second three-dimensional interaction with the first virtual object:
changing a visible property of the first virtual object to indicate the assignment of the first issue to the second user.

3. The method of claim 2, wherein changing the visible property of the first virtual object to indicate the assignment of the first issue to the second user comprises changing a color of the first virtual object.

4. The method of claim 3, wherein:
the first user is associated with a first color;
the second user is associated with a second color different from the first color; and
changing the color of the first virtual object comprises changing the color of the first virtual object from a third color to the second color.

5. The method of claim 4, wherein causing the three-dimensional virtual environment to be displayed further comprises causing a portion of the representation of the first user to have the first color.

6. The method of claim 1, wherein:
the first three-dimensional interaction comprises the representation of the first user handing the first virtual object to the representation of the second user; and
the second three-dimensional interaction comprises the representation of the second user accepting the first virtual object from the representation of the first user.

7. The method of claim 1, wherein the first three-dimensional interaction with the first virtual object corresponds to the first virtual object being thrown to the representation of the second user.

8. The method of claim 1, wherein a supplemental representation of the first virtual object remains in the three-dimensional workspace while the first virtual object is being offered to the second user.

9. A method of facilitating a virtual meeting using virtual interactions with three-dimensional virtual objects to change statuses of issues being tracked by an issue-tracking system, the method comprising:
identifying, in the issue-tracking system, a set of issues to be represented in the virtual meeting, each respective issue of the set of issues associated with a respective issue record indicating a current status of the respective issue, wherein the current status of the respective issue indicates a progress of the respective issue through a predetermined sequence of issue statuses;
retrieving, from the issue-tracking system, the current status of each issue of the set of issues;
causing a three-dimensional virtual environment to be displayed to a first user and a second user, the three-dimensional virtual environment comprising:
a representation of the first user;
a representation of the second user;
a representation of a three-dimensional workspace; and
a set of virtual objects, each respective virtual object of the set of virtual objects:
associated with a respective issue in the set of issues; and
having a respective location in the three-dimensional workspace that corresponds to a current status of the respective issue;
receiving, from the first user:
a first three-dimensional interaction with a virtual object of the set of virtual objects, the virtual object associated with an issue of the set of issues, the first three-dimensional interaction comprising a first gesture resulting in a selection of the virtual object; and
a second three-dimensional interaction, the second three-dimensional interaction comprising a second gesture resulting in an offer to assign the issue to the second user;
receiving, from the second user, a third three-dimensional interaction with the virtual object, the third three-dimensional interaction corresponding to an acceptance, by the second user, of the assignment of the issue; and
in response to receiving the third three-dimensional interaction with the virtual object, causing the issue-tracking system to assign the issue to the second user, wherein:
the three-dimensional virtual environment is selectively viewable, by each of the first user and the second user, in:
a first viewing scheme in which a first subset of virtual objects, of the set of virtual objects, that are associated with issues that are assigned to a particular user are visually differentiated from a second subset of virtual objects, of the set of virtual objects, that are associated with issues that are assigned to users other than the particular user; and
a second viewing scheme in which each virtual object of the set of virtual objects is displayed in a same visual style; and
in response to a selection, by the first user, of the first viewing scheme and a selection, by the second user, of the second viewing scheme, contemporaneously causing the three-dimensional virtual environment to be displayed to the first user according to the first viewing scheme and to the second user according to the second viewing scheme.

10. The method of claim 9, wherein:
in the first viewing scheme:
the first subset of virtual objects is displayed in accordance with a first visual style; and
the second subset of virtual objects is displayed in accordance with a second visual style different from the first visual style;
the first visual style is a representation of a virtual object as a solid three-dimensional object; and
the second visual style is a representation of the virtual object as a wireframe three-dimensional object.

11. The method of claim 9, wherein:
in the first viewing scheme:
the first subset of virtual objects is displayed in accordance with a first visual style; and
the second subset of virtual objects is displayed in accordance with a second visual style different from the first visual style;
the first visual style corresponds to a first transparency level of a virtual object; and
the second visual style corresponds to a second transparency level of the virtual object.

12. The method of claim 9, wherein:
the issue is a first issue;
the virtual object is a first virtual object; and
the method further comprises:
  detecting a voice input from the first user during the virtual meeting;
  determining, from the voice input, an identifier of a target assignee of a second issue associated with a second virtual object; and
  recording the identifier of the target assignee in an issue record of the second issue.

13. The method of claim 9, further comprising, in response to the assignment of the issue to the second user, changing a visible property of the virtual object to indicate the assignment of the issue to the second user.

14. The method of claim 9, further comprising:
  receiving, from at least one of the first user or the second user, a fourth three-dimensional interaction with the virtual object, the fourth three-dimensional interaction including a movement of the virtual object in the three-dimensional virtual environment; and
  in response to receiving the fourth three-dimensional interaction with the virtual object, changing a status of an issue associated with the virtual object.

15. A method of facilitating a virtual meeting using virtual interactions of three-dimensional virtual objects to change statuses of issues being tracked by an issue-tracking system, the method comprising:
  identifying, in the issue-tracking system, a set of issues to be represented in the virtual meeting, each respective issue of the set of issues associated with a respective issue record having a respective set of attributes and indicating a current status of the respective issue, wherein the current status of the respective issue indicates a progress of the respective issue through a predetermined sequence of issue statuses;
  retrieving, from the issue-tracking system, the current status of each issue of the set of issues;
  causing display of a three-dimensional virtual environment to a first user and a second user, the three-dimensional virtual environment comprising:
    a representation of the first user;
    a representation of the second user;
    a representation of a three-dimensional workspace; and
    a set of virtual objects, wherein a virtual object of the set of virtual objects is:
      associated with an issue in the set of issues; and
      has a respective location in the three-dimensional workspace that corresponds to a current status of the issue;
  detecting a first virtual interaction between the first user and the virtual object in the three-dimensional virtual environment, the first virtual interaction corresponding to the first user handing the virtual object to the second user; and
  detecting a second virtual interaction between the second user and the virtual object, the second virtual interaction corresponding to an acceptance, by the second user, of the virtual object;

in response to the acceptance, by the second user, of the virtual object:
    causing the issue-tracking system to assign the issue to the second user; and
    changing a visual property of the virtual object in the three-dimensional virtual environment, wherein:
  the three-dimensional virtual environment is selectively viewable, by each of the first user and the second user, in:
    a first viewing scheme in which a first subset of virtual objects, of the set of virtual objects, that are associated with issues that are assigned to a particular user are visually differentiated from a second subset of virtual objects, of the set of virtual objects, that are associated with issues that are assigned to users other than the particular user; and
    a second viewing scheme in which each virtual object of the set of virtual objects is displayed in a same visual style; and
  in response to a selection, by the first user, of the first viewing scheme and a selection, by the second user, of the second viewing scheme, contemporaneously causing the three-dimensional virtual environment to be displayed to the first user according to the first viewing scheme and to the second user according to the second viewing scheme.

16. The method of claim 15, wherein:
the visual property is a first visual property;
the method further comprises:
  detecting a third virtual interaction between the first user and the virtual object in the three-dimensional virtual environment, the third virtual interaction configured to change a status of the issue; and
  in response to detecting the third virtual interaction, changing a second visual property of the virtual object in the three-dimensional virtual environment, the second visual property different from the first visual property;
the first visual property is a color of the virtual object; and
the second visual property is a shape of the virtual object.

17. The method of claim 15, further comprising:
detecting a selection of the virtual object; and
in response to detecting the selection of the virtual object, displaying, in the three-dimensional virtual environment, a completion percentage of the issue associated with the virtual object.

18. The method of claim 15, further comprising:
detecting a change in at least one of an issue status or a completion percentage of the issue; and
in response to detecting the change in the at least one of the issue status or the completion percentage of the issue, causing a position of the virtual object in the three-dimensional virtual environment to be changed in accordance with the change in the at least one of the issue status or the completion percentage of the issue.

* * * * *